United States Patent [19]
Culpen

[11] Patent Number: 5,755,543
[45] Date of Patent: May 26, 1998

[54] MACHINE SCREW

[76] Inventor: James E. Culpen. 22112 Indian Trail. Justin, Tex. 76247-9488

[21] Appl. No.: 785,687

[22] Filed: Jan. 17, 1997

[51] Int. Cl.⁶ ............................................. F16B 35/04
[52] U.S. Cl. .......................... 411/419; 411/448; 411/54
[58] Field of Search .......................... 411/54, 385, 392, 411/417–421, 448, 449

[56] References Cited

U.S. PATENT DOCUMENTS

| | | | |
|---|---|---|---|
| 771,336 | 10/1904 | Thomson | 411/419 |
| 1,438,648 | 12/1922 | Jacobs | 411/54 |
| 2,024,805 | 12/1935 | Place | 411/448 |
| 2,549,393 | 4/1951 | Siesel | 411/419 |
| 4,845,317 | 7/1989 | Wilson | 411/392 |

*Primary Examiner*—Flemming Saether
*Attorney, Agent, or Firm*—Larry L. Uland

[57] ABSTRACT

An improved machine screw for engaging a correspondingly threaded aperture, comprising a threaded shank having a proximal portion and a distal portion. A head adapted to be rotated may be formed on a shank proximal end opposite the shank distal portion, such that the shank extends axially therefrom. The shank is deformable from a first position to a second position, for either (1) minimizing the contacting surface area between the shank and said aperture, and thereby allowing the machine screw to be easily insertable into said aperture, or (2) maximizing the contacting surface area between the shank and said aperture after the shank has been fully inserted into said aperture, and thereby making the hold between the screw and said aperture more secure. Such deformation of the screw occurs during its insertion into said aperture. It has been found that this deformation prevents screws of the present invention from seating improperly within threads of said aperture. Furthermore, the screw may be formed of a resilient material for allowing it to deform again as it is extracted from said aperture, and even to reform into its original shape after it has been thus extracted. The shank further includes an elongate, open-sided slot extending axially from the shank distal end toward the shank proximal end, for dividing at least a portion of the shank into at least two elongate shank legs.

5 Claims, 15 Drawing Sheets

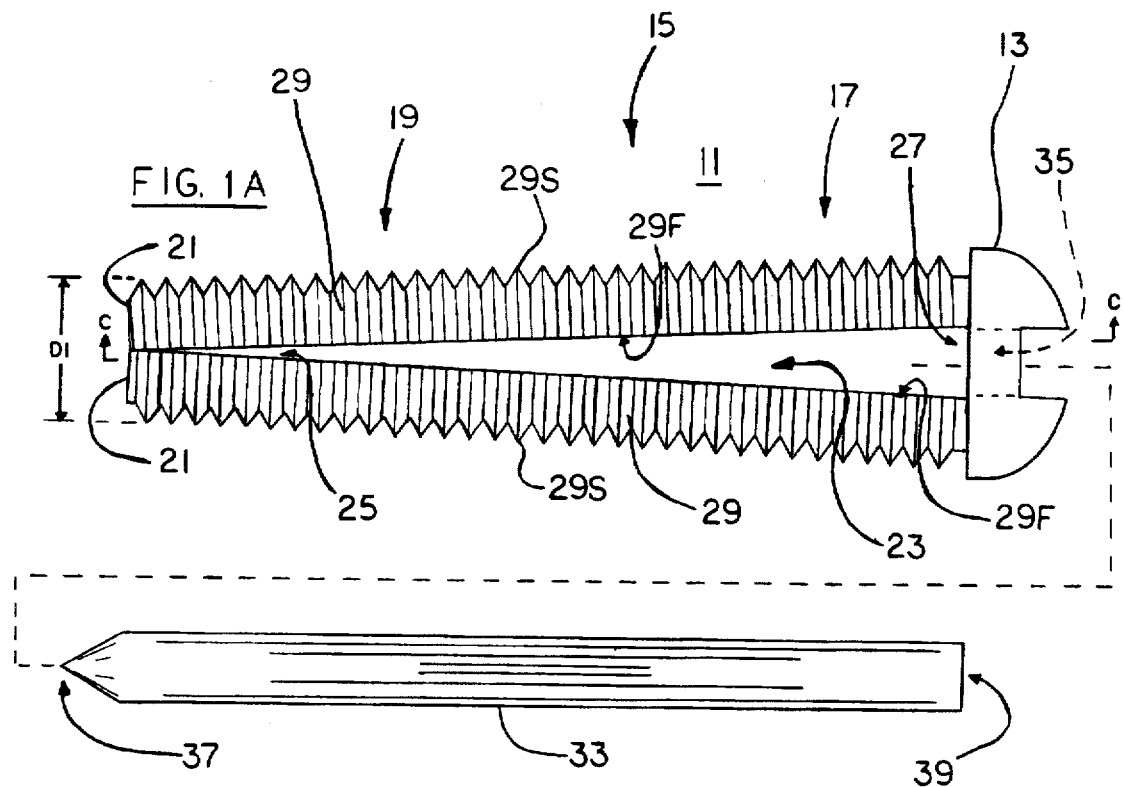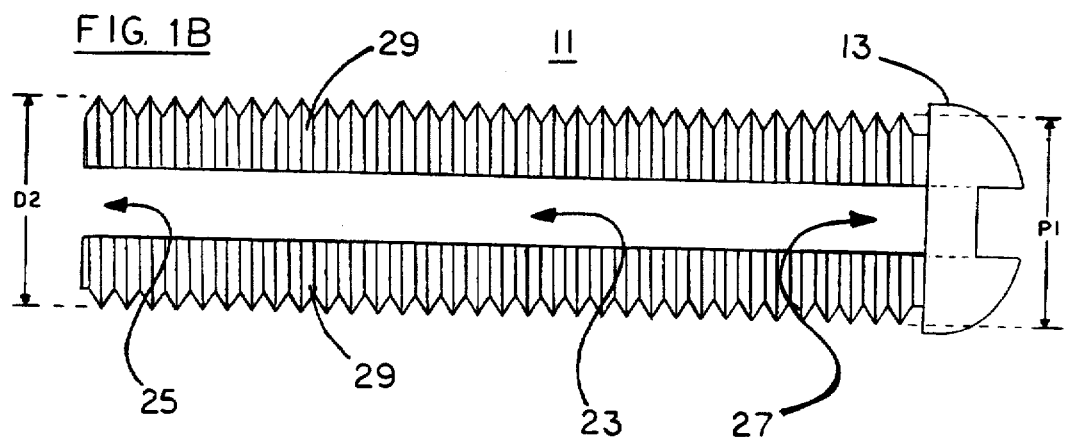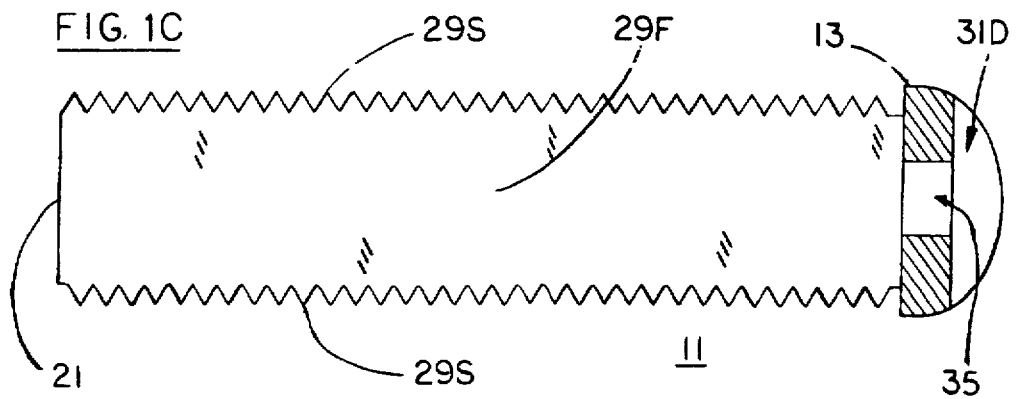

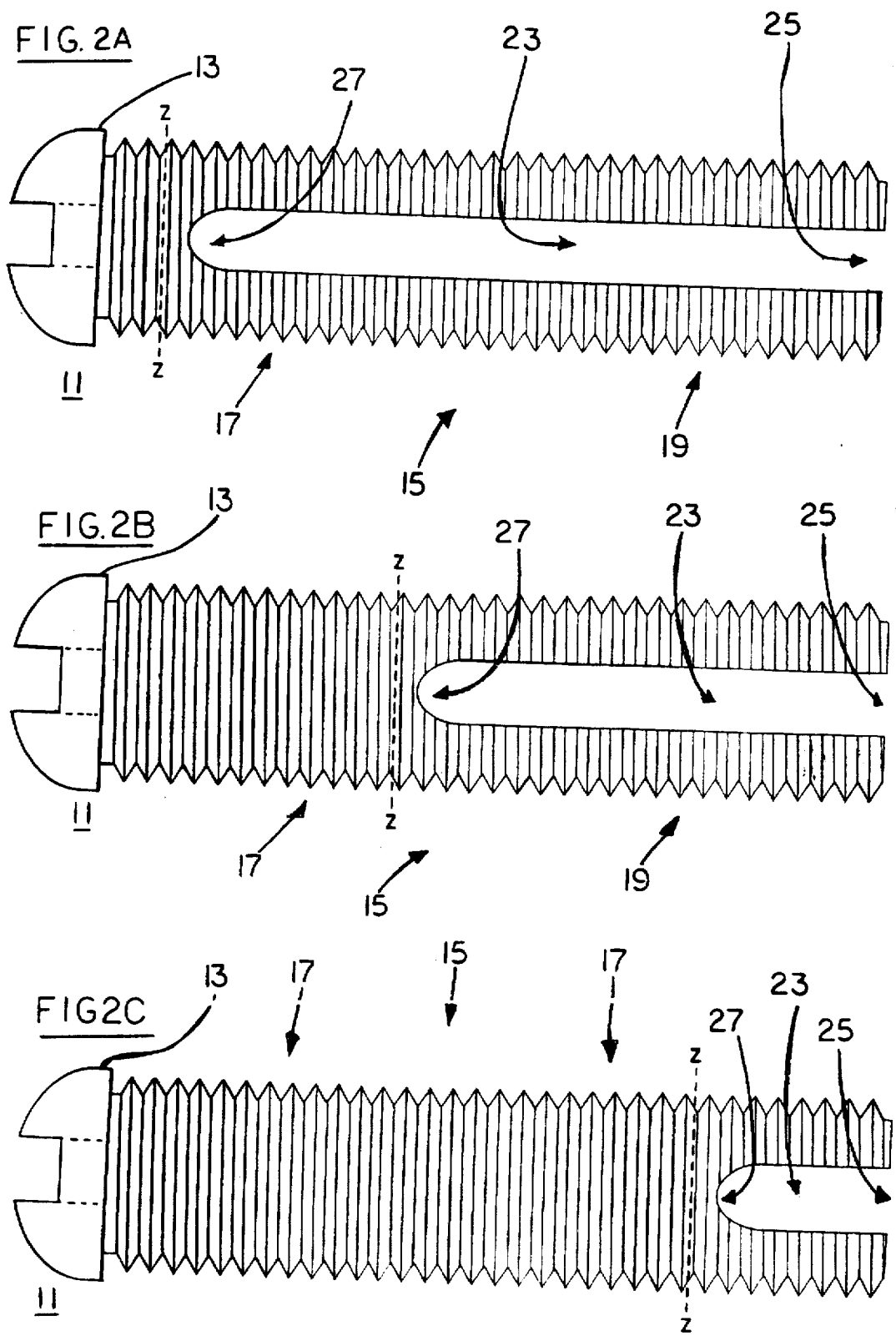

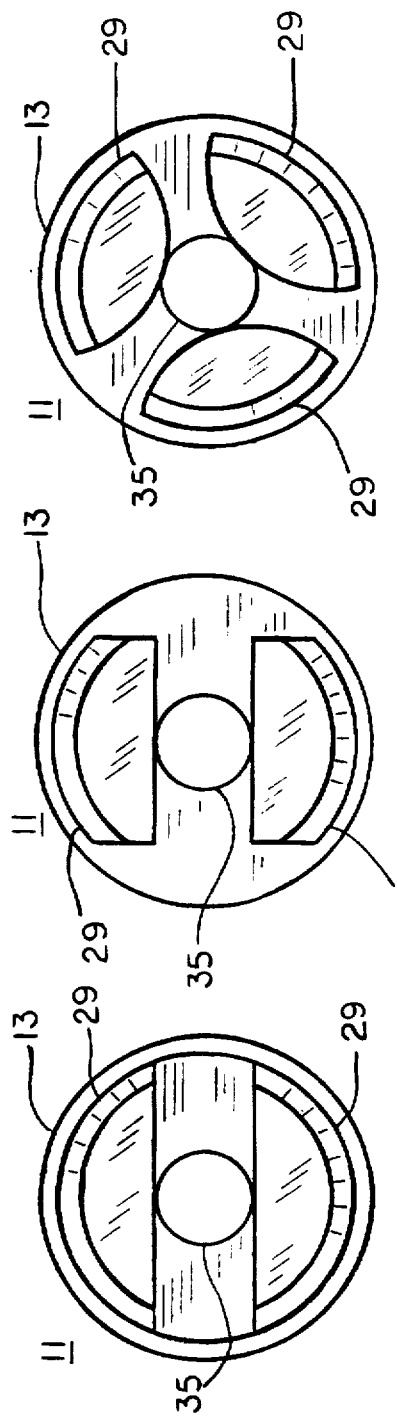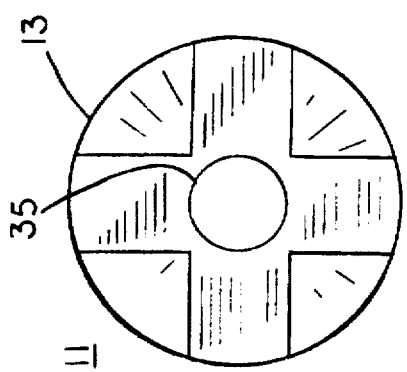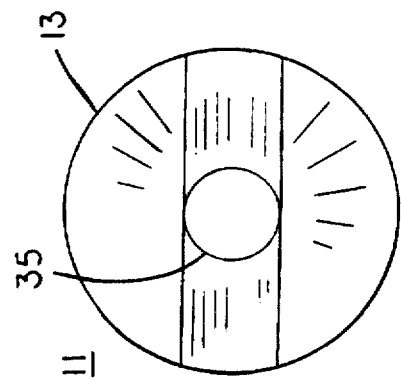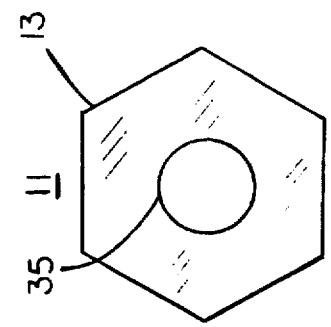

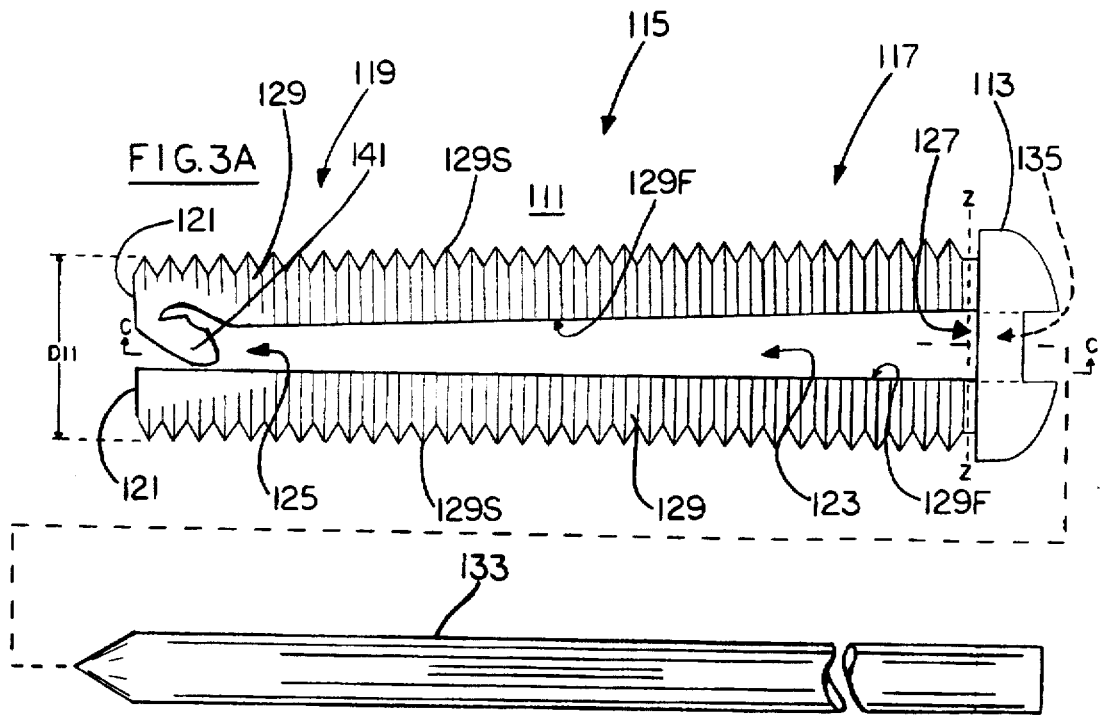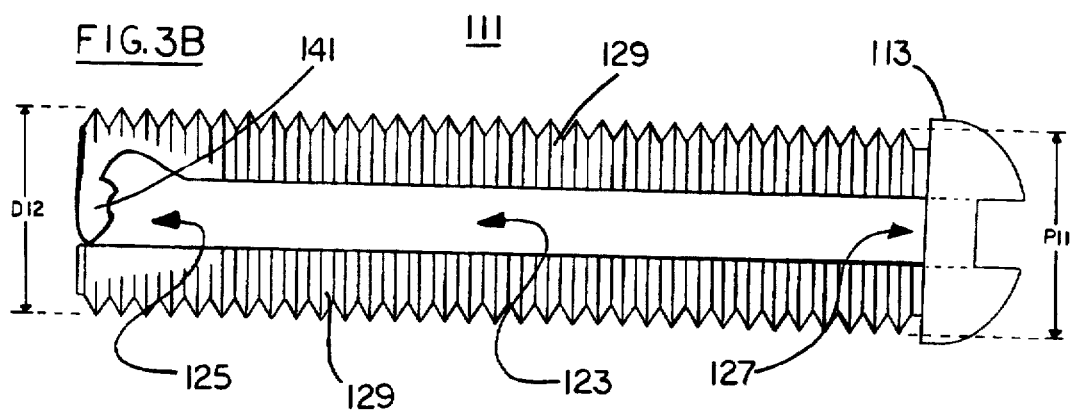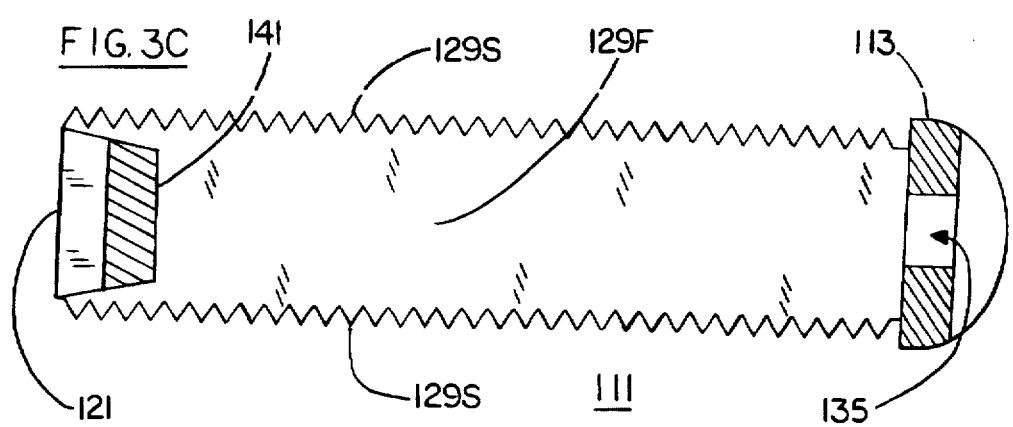

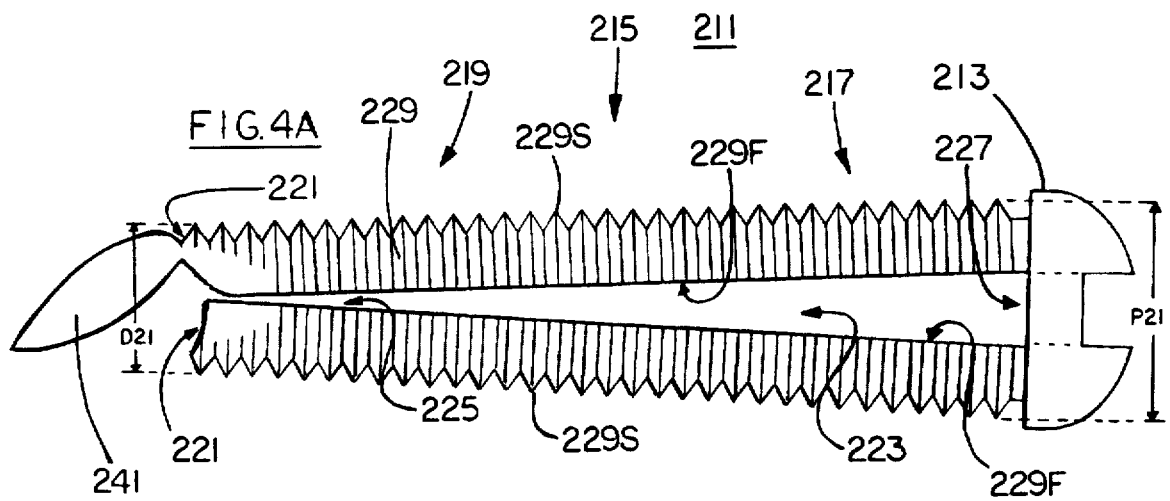
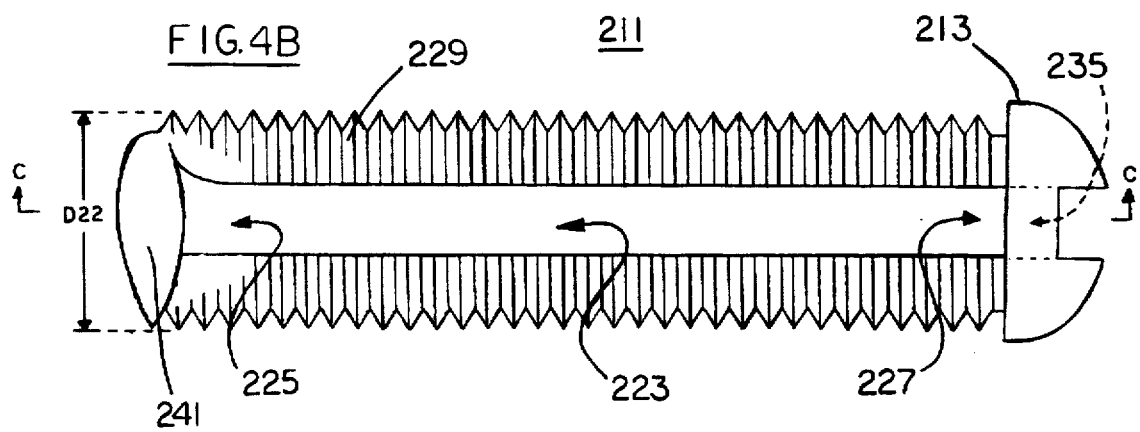
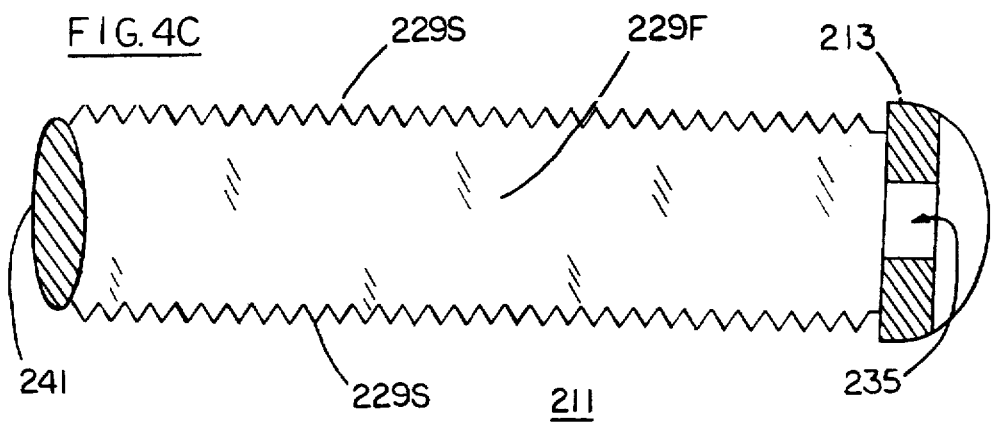

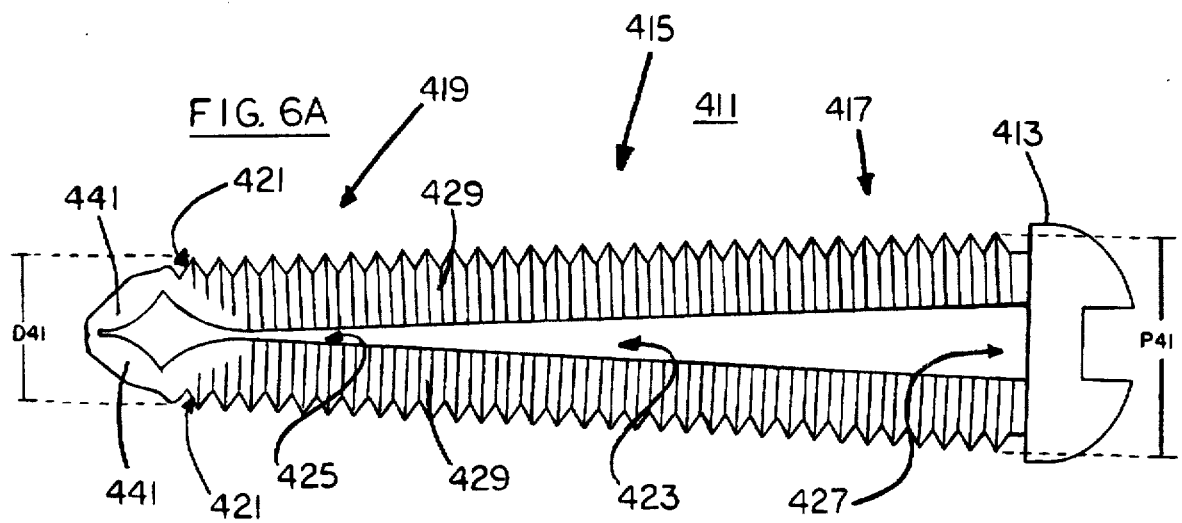
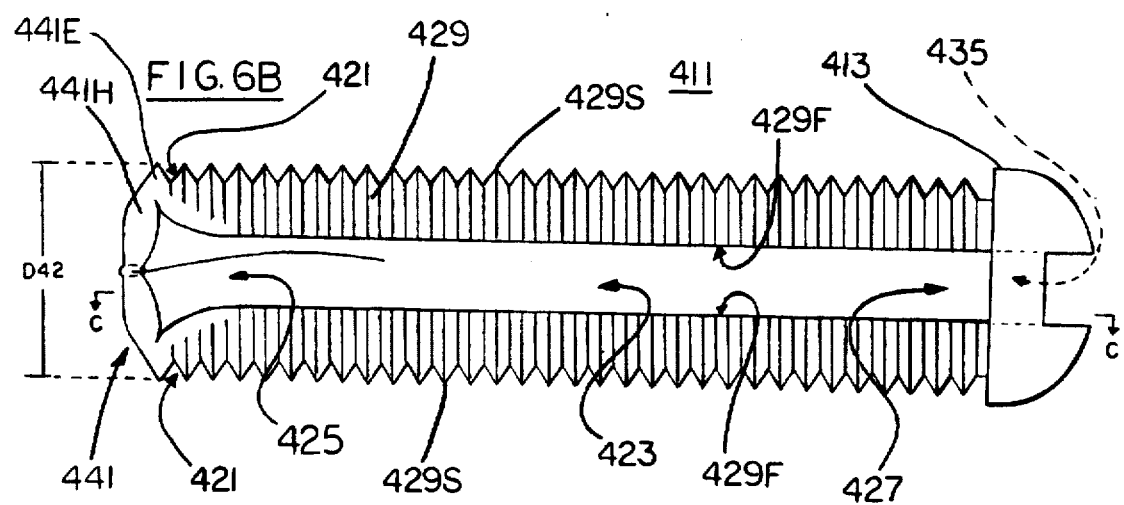
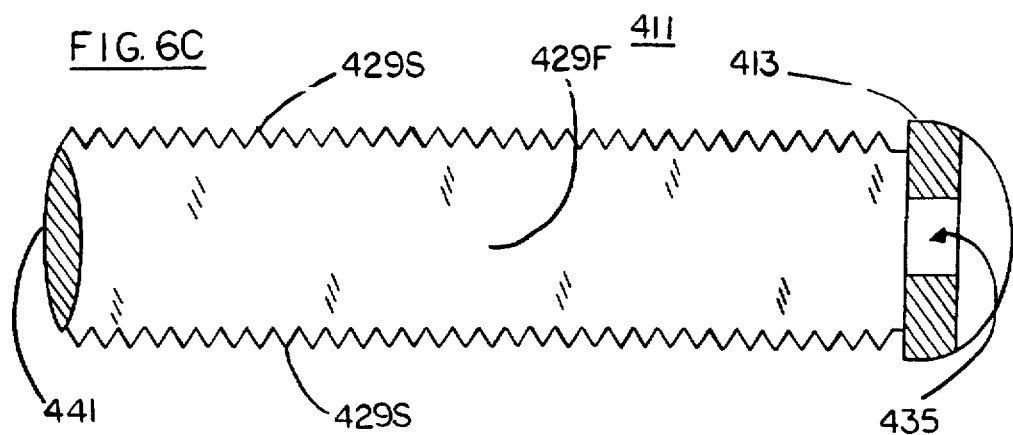

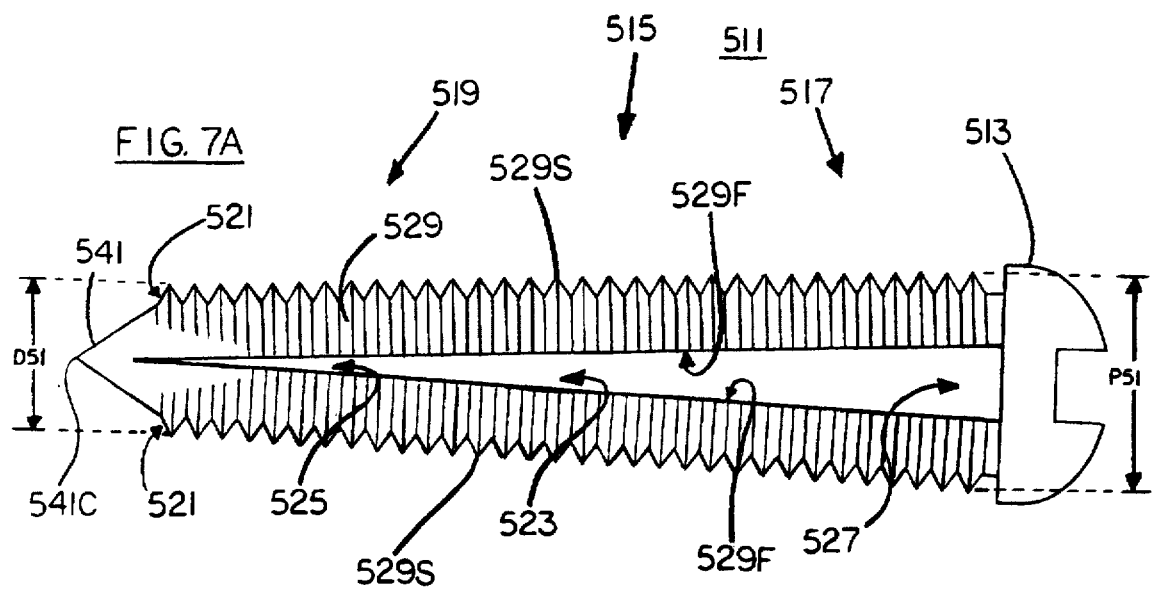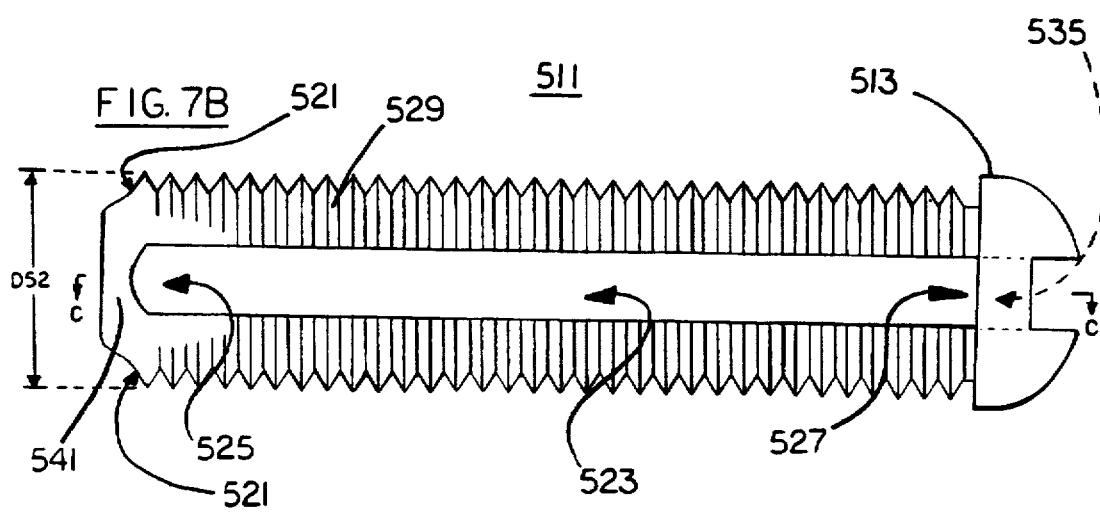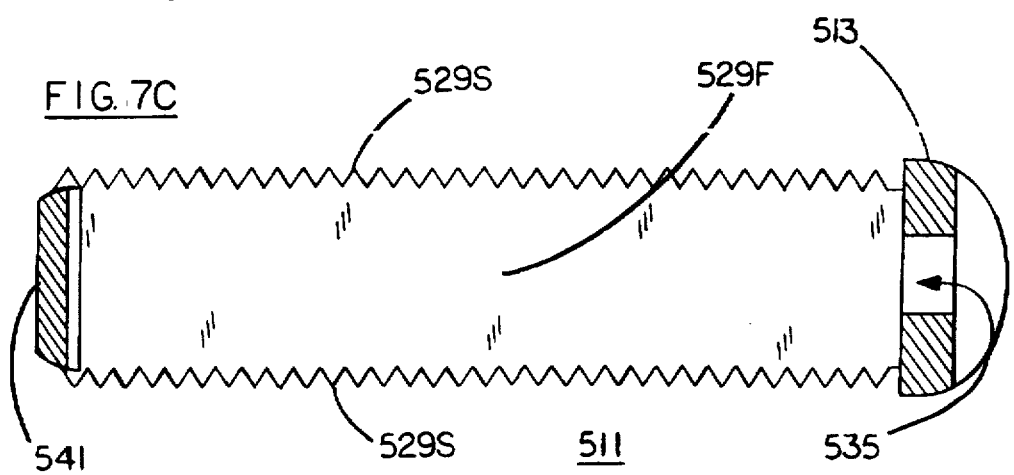

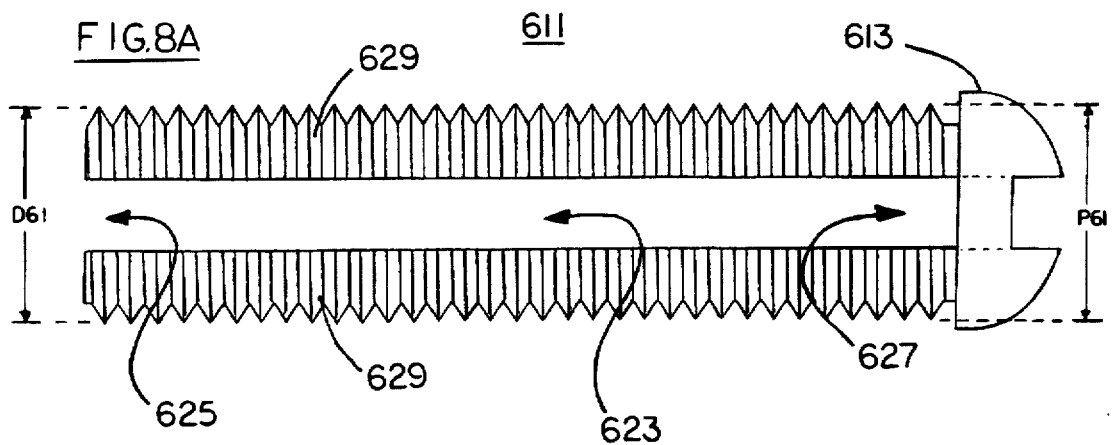
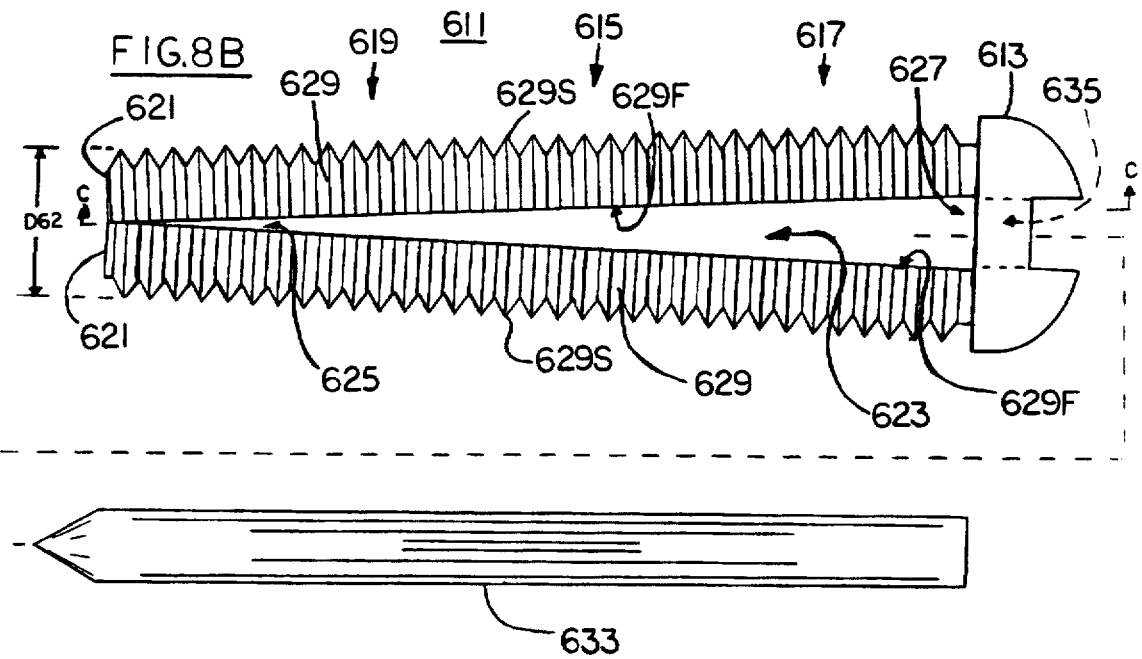
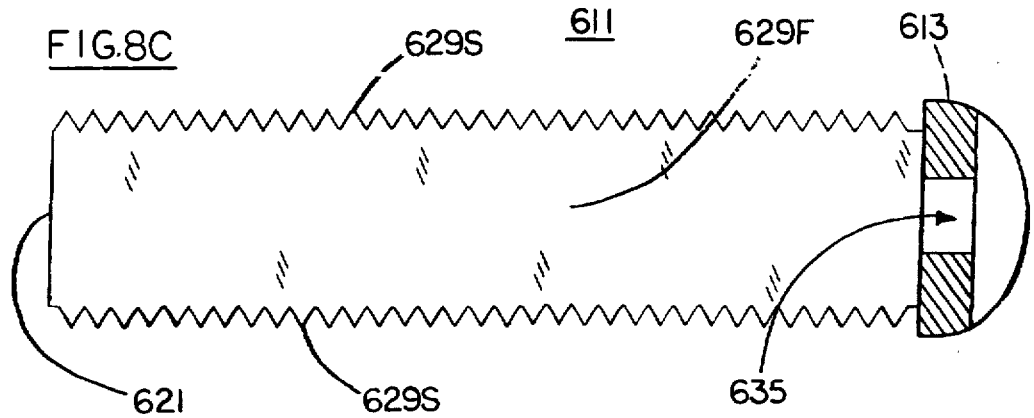

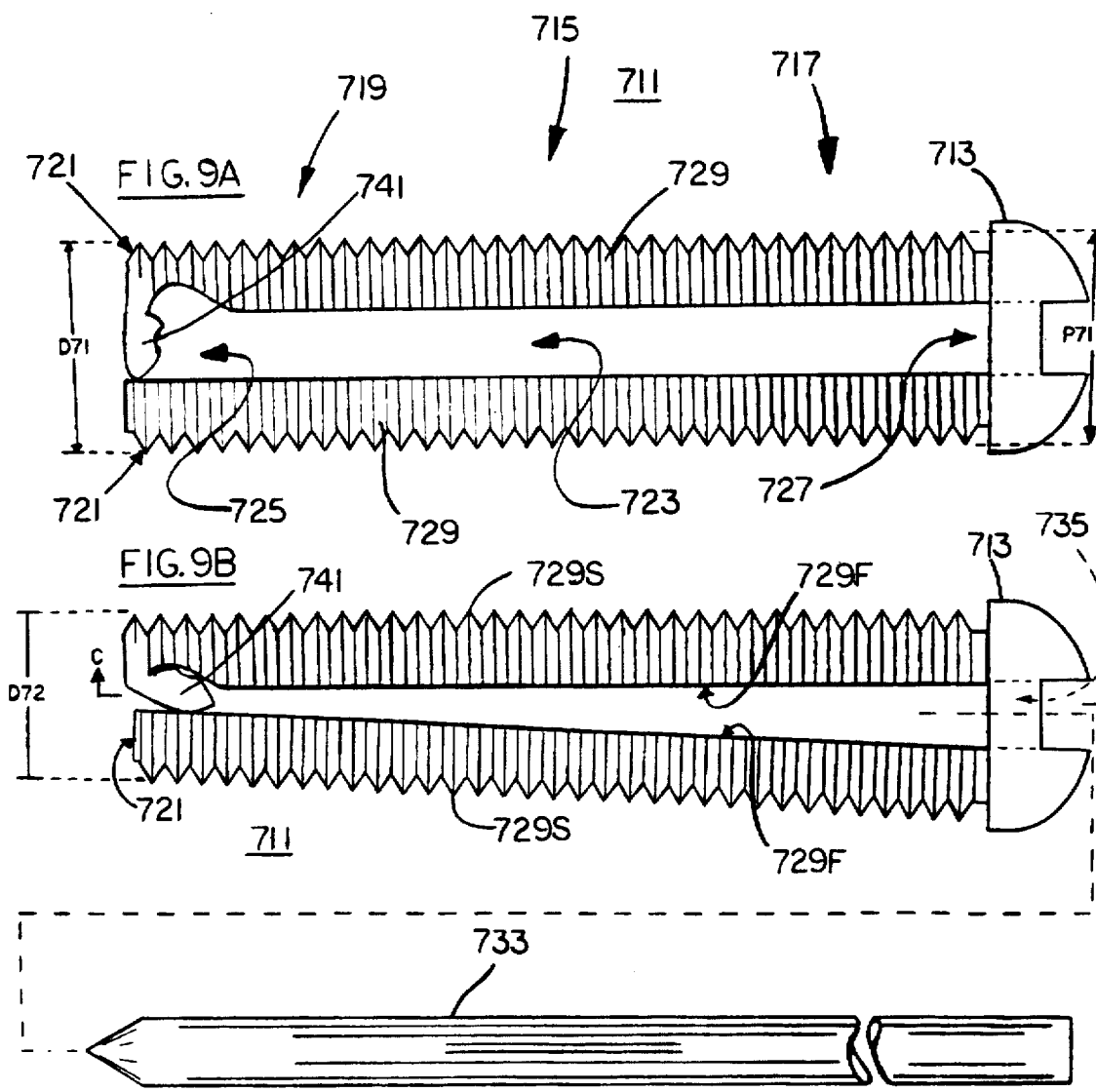
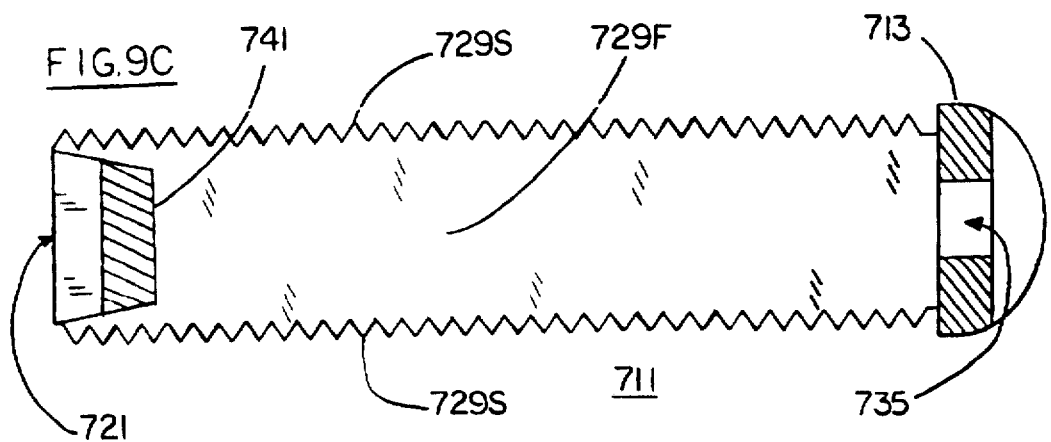

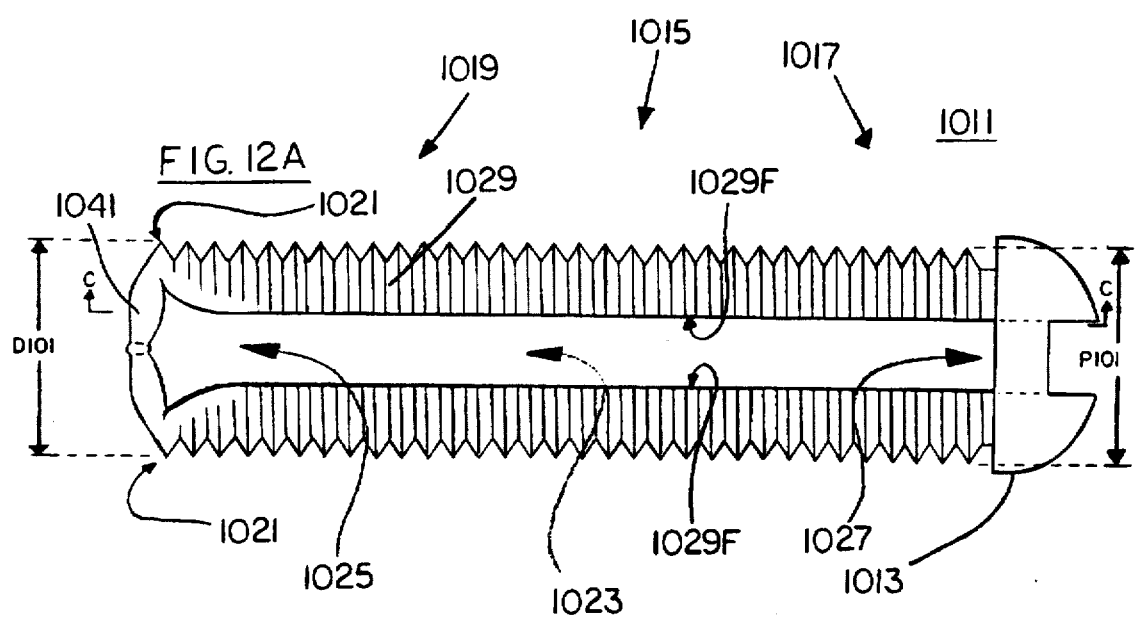
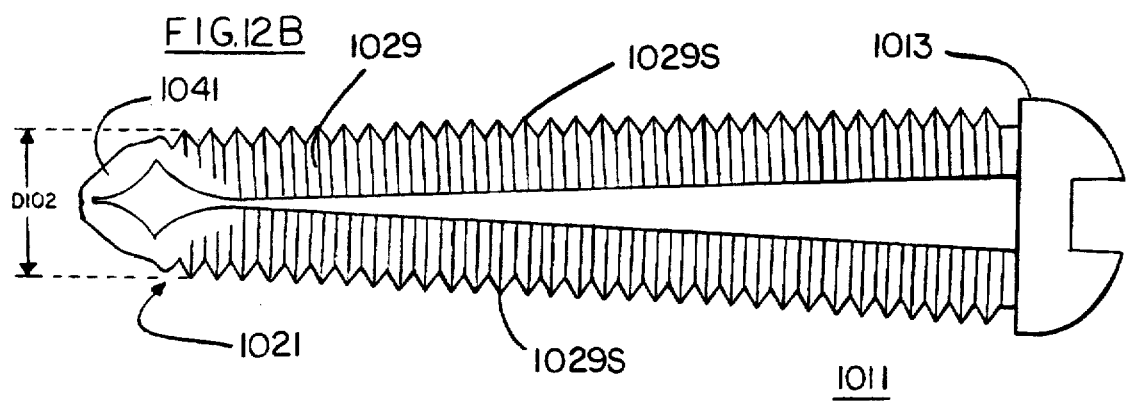
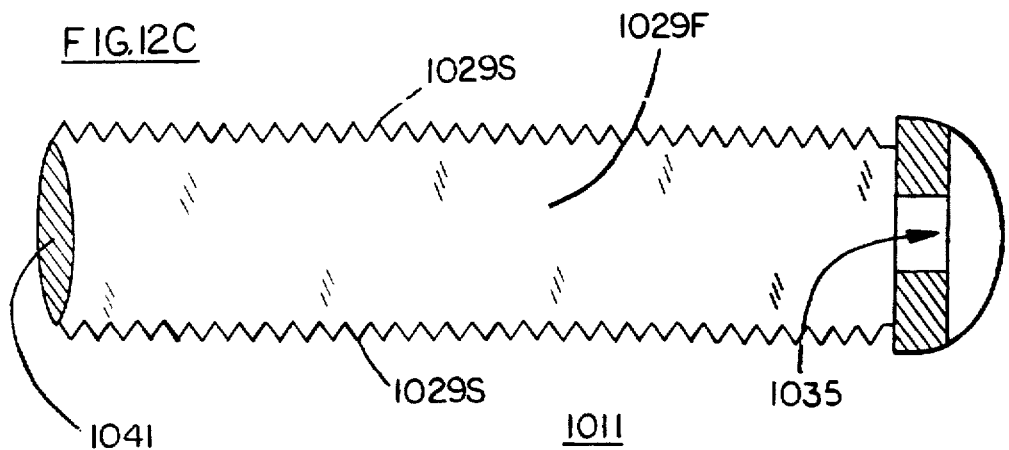

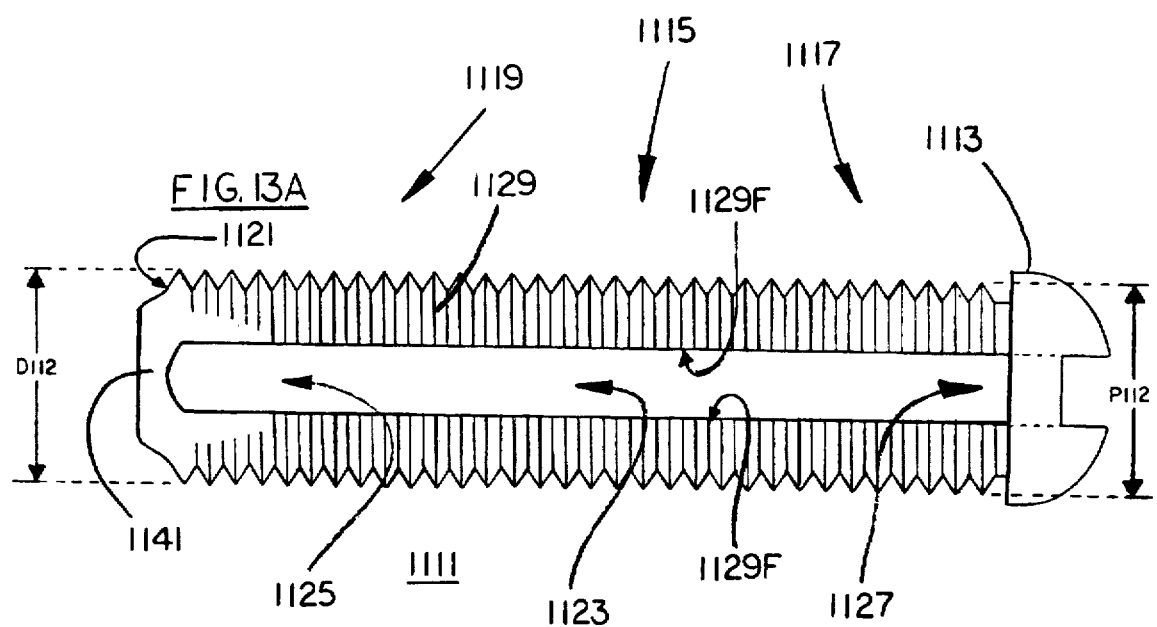
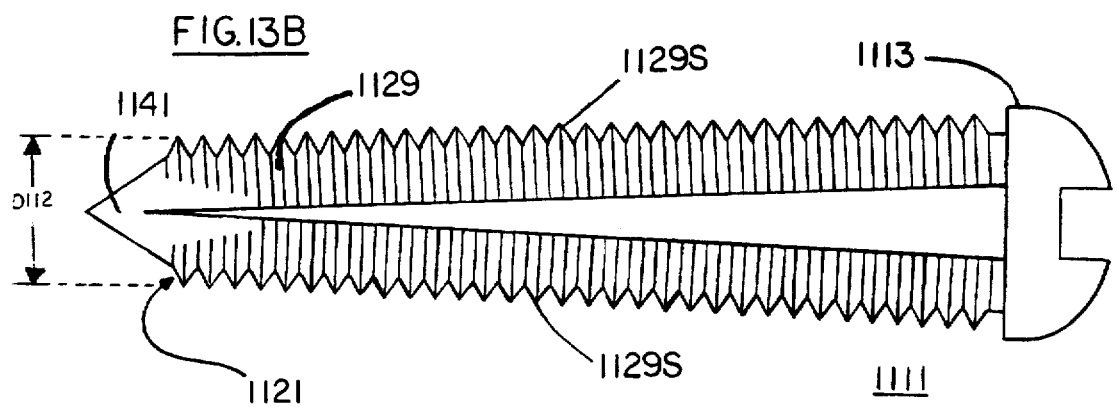
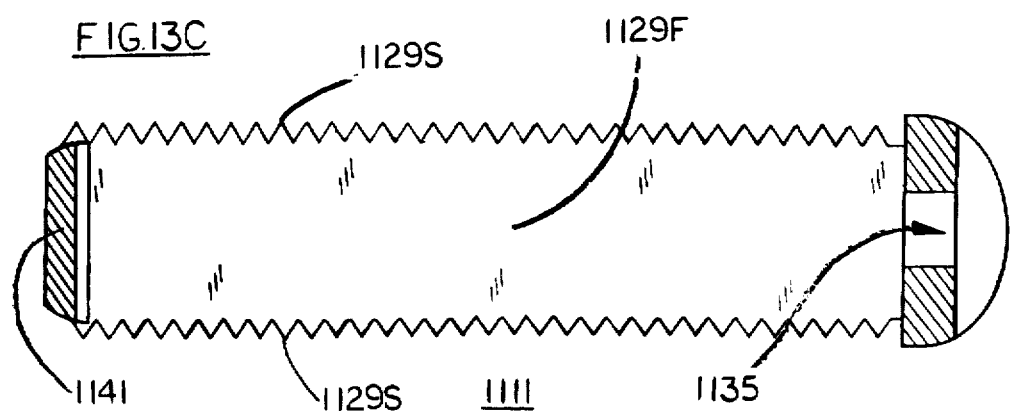

MACHINE SCREW

RELATED DISCLOSURE

This relates to an earlier application filed with the U.S. Patent and Trademark Office on Dec. 2, 1994 entitled MACHINE SCREW, which application has since issued as U.S. Pat. No. 5,542,799.

BACKGROUND OF THE INVENTION

The present invention is related to fasteners, and in particular to a machine screw that can be partially inserted into a correspondingly threaded aperture without rotation, and, once the screw is at least partially inserted, can then be expanded for fitting more securely inside the aperture, and further can be compressed for extracting from said aperture.

Screws have been used for centuries to hold devices together, and can be found in two basic forms: a wood screw which generally is pointed at one end and has a substantially cylindrical shank shaped generally like a wedge, having a smaller diameter at said pointed end than at the other end; and a machine screw having a shank which is generally cylindrical with uniform diameters at each end, for fitting in a cylindrical correspondingly threaded aperture.

As newer materials and methods of assembly have been developed, needs for improvement in the form of machine screws have arisen, including the need for reusable machine screws which can be relied upon to hold fast once they are inserted, and which can be inserted more quickly and easily into an associated aperture. Several types of such fasteners have been developed in attempts to meet these needs. Unfortunately, two significant other needs now exist within the art which have yet to be adequately addressed: (1) the need for a reusable machine screw type fastener which is more easily extractable than previous forms of such fastener; and (2) the need for a machine screw type fastener which is self-aligning, for correcting misalignment errors made during initial insertion.

One type of machine screw fastener of the prior art focuses on the need for tightly securing fasteners inside an aperture into which they have been inserted. Examples of these type screws can be seen in the following U.S. Patents describing self-locking fasteners: U.S. Pat. No. 3,202,194 by Jones and U.S. Pat. No. 3,351,966 by Pelochino. The teaching of Jones provides an externally threaded machine screw type fastener adapted for use with a corresponding internally threaded aperture. This screw includes an elongated shank having a slotted head at one end and a tapered tip at the other. Said tip and a portion of the shank is bifurcated by an open sided slot having parallel confronting faces; said slot extending from the tip for a substantial distance along the shank. A wedge of resiliently compressible material is adapted to be received within the slot for completely filling and expanding the same, so that laterally opposed thread segments on the shank between the tapered end and the head are spread apart beyond the diameter of corresponding threads in the associated aperture, and that laterally opposed threads of the tapered tip are spread sufficiently apart for interfitting with the aperture. As the fastener is inserted into the aperture, the slotted portion of the shank is forcibly contracted against the resiliently compressible wedge, for tightly securing the aperture and the screw together. Although this fastener addresses the need for being tightly secured to the associated aperture, it fails to address the need for being inserted into said aperture quickly and with relative ease. Indeed, the spreading apart of the bifurcated sections of the shank before insertion of the fastener, creates significant friction between corresponding threads of the fastener and associated aperture, which friction cannot help but make it more difficult to perform said insertion.

The teaching of Pelochino provides a machine screw type fastener substantially similar to that of Jones, in that it includes a shank divided by an elongated slot extending from a tapered tip of the shank toward a screw head at the opposite shank end, said shank being thus divided into a pair of resilient cantilevered segments. Means is also provided for spreading apart said segments and thereby enlarging the shank diameter between the tapered tip and the head, said means being in the form of either an end plug or a transverse pin placed in only the tapered tip region of the cantilevered shank segments. Selected threads between the tapered tip and the head are also slightly enlarged for increasing the static friction between threads of the fastener and the aperture, and thereby allowing for a secure fitting between same. Like the teaching of Jones, the locking screw of Pelochino addresses the need for a screw that may be tightly secured within an associated aperture. Like the device of Jones, the Pelochino device relies upon providing a greater amount of friction than ordinary machine screws of similar size are capable of providing between the fastener shank and the corresponding inner walls of an associated aperture into which it is intended to be inserted. Unfortunately, also like Jones, because the Pelochino device relies on expanding the natural diameter of a portion of its shank beyond the size of an associated aperture into which it is to be inserted before such insertion, the Pelochino device is simply unable to match the relative ease with which fasteners of the present invention are able to be inserted and extracted from associated apertures.

Another type of fastener in the art focuses more completely on quick assembly. A good example of this type fastener is found in U.S. Pat. No. 3,115,804 by Johnson, in which is provided a bolt constructed of resilient material and having a head portion and a shank portion. The shank portion has two flexible legs cantilevered from the head portion and terminating in lips having transverse cam faces and inclined wedge faces. An elongated longitudinal opening separates the two legs apart from each other transversely of the longitudinal shank axis by a space sufficient to allow deflection of the legs adequate to permit the leg lips to clear corresponding mating lips of an opening in a specially designed corresponding aperture or "mating member" when the shank is inserted in such opening by longitudinal movement. After such deflection, the shank lips spring back into their original position. Such design allows for the placement of these fasteners into operable position via the application of a longitudinal axial force onto the head thereof. Various types of slots are also provided in the head of each fastener for allowing them to be extracted from the associated mating member via the use of an appropriate torquing tool, such as a screw driver. Although the teaching of Johnson effectively addresses the need for fasteners which can be quickly and easily inserted into an associated mating member, the design of this teaching fails to provide for extraction means which is just as quick or easy. Also, the fasteners of Johnson fail to address the need for being tightly secured within an associated aperture as effectively as does the machine screw of the instant invention.

Another type of push-in fastener which has been developed includes multiple variations on the "pine-tree" or "Christmas tree" structure, in which a shaft has a number of fins or ribs extending outwardly therefrom, either perpendicularly or at an angle toward the head of the fastener. Such ribs are designed to deform as the fastener is inserted into the receiving hole, which deformation provides the frictional force required to hold the fastener in place. Unfortunately, such deformation also prevents the device from being removed easily without being damaged, resulting therefore, in such fasteners not being normally used where the fastener is expected to be removed and then reinserted. One example of this type fastener may be seen in the U.S. Pat. No. 4,850,778 by Clough et al.

These and other such devices now in the art have attempted to address the need for a machine screw type fastener which is capable of: (1) being quickly and easily inserted into an associated aperture; and of (2) being tightly secured within said aperture. Unfortunately, none have addressed adequately the need for a fastener which is capable of addressing both of the foregoing needs simultaneously with as great efficiency as fasteners of the present invention. Also, none has addressed adequately the need for a reusable machine screw type fastener which: (1) is more easily extractable from apertures into which it is inserted than previous forms of such fastener; and (2) is self-aligning, for correcting misalignment errors made during initial insertion.

SUMMARY OF THE INVENTION

In view of the foregoing disadvantages inherent in the known types of machine screws now present in the art, the invention disclosed herein provides an improved machine screw for engaging a cylindrical correspondingly threaded aperture, which machine screw comprises a substantially cylindrical shank, including a proximal portion and a distal portion. A head adapted to be rotated may be formed on a shank proximal end opposite the shank distal portion, such that the shank extends axially therefrom, with a shank distal end opposite the head. At least a portion of the shank includes threads on the surface thereof for engaging said correspondingly threaded aperture. The shank is deformable from a first position to a second position, for either (1) minimizing the contacting surface area between corresponding threads of the shank and said aperture during insertion and extraction procedures, or (2) maximizing the contacting surface area between the corresponding threads of the shank and said aperture after the shank has been fully inserted into said aperture, and thereby making the hold between the screw and said aperture more secure. Accordingly, means is provided for deforming the screw shank. The shank further includes an elongate, open-sided slot extending axially from the shank distal end toward the shank proximal end, for dividing at least a portion of the shank into at least two elongate shank legs. The slot further includes a distal end which may be open, and a proximal end which may be closed. Upon a closer review of the more detailed description herein, those skilled in the art will recognize that the concepts of the present invention easily overcome the problems described above which have been heretofore commonly associated with fasteners and machine screws. As such, the general purpose of the present invention is to provide a new and improved machine screw which has all the advantages of the prior art and none of the disadvantages.

It is an additional object of the present invention to provide a new and improved machine screw which is capable of being quickly and easily inserted into a correspondingly threaded aperture.

It is an additional object of the present invention to provide a new and improved machine screw which is capable of being tightly secured within a correspondingly threaded aperture.

It is an additional object of the present invention to provide a new and improved machine screw which is capable of being quickly and easily extracted from an aperture in which it has been inserted, in such manner as to allow said fastener to be used again.

It is an additional object of the present invention to provide a new and improved machine screw which is capable of self-correcting an initially misaligned insertion and thereby seating properly within an associated aperture.

It is an additional object of the present invention to provide a new and improved machine screw which is capable of accomplishing all the following: (1) being quickly and easily inserted into an associated aperture; (2) being tightly secured within said aperture; (3) being quickly and easily extracted from said aperture in such manner as to allow said fastener to be used again; and (4) self-correcting an initially misaligned insertion for seating properly within an associated aperture.

It is an additional object of the present invention to provide a new and improved machine screw which is capable of being repeatedly removed and installed without being damaged.

It is an additional object of the present invention to provide a new and improved machine screw which may be easily and efficiently manufactured, marketed and installed.

It is still a further object of the present invention to provide a new and improved machine screw which is of durable and reliable construction.

It is yet still a further object of the present invention to provide a new and improved machine screw which meets all federal, state, local and other applicable governing body statutes and regulations, as well as other private standards, guidelines, and industry recommendations with respect to health, safety, environmental friendliness, energy conservation, etc.

These together with other objects of the invention, along with the various features of novelty which characterize the machine screw of the present invention, are pointed out with particularity in the claims appended hereto and forming part of this disclosure. The more important objects of the present invention have been outlined rather broadly in order that the detailed description thereof which follows may be better understood, and in order that the present contribution to the art may be better appreciated. For a better understanding of the instant invention, its operational advantages and the specific objects attained by its uses, reference should be made to the accompanying drawings and descriptive matter in which there are illustrated various embodiments of the invention.

Those versed in the art will readily ascertain, however, that the present invention is capable of other embodiments and of being practiced and carried out in various other ways. In this respect, the details of construction disclosed herein, including the component materials and the arrangements of the components set forth in the following description and appended drawings, are for illustrative purposes, only, and are not intended to be limiting in scope. Those skilled in the art will appreciate, as well, that the conception upon which this disclosure is founded, may be readily utilized as a basis for the designing of other structures, methods, and systems for carrying out the several purposes of the present invention. Said other structures may include, but are not limited to, those which are aesthetic in nature, or those which include the substitution of other materials as they become available, and which substantially perform the same function in substantially the same manner with substantially the same result as the present invention. It is important, therefore, that the claims appended hereto be regarded as including such equivalent materials, structures, constructions, methods, and systems insofar as these do not depart from the spirit and scope of the present invention.

BRIEF DESCRIPTION OF THE DRAWINGS

The invention will be better understood and objects other than those set forth above will become apparent when consideration is given to the following detailed description. Such description makes reference to the appended drawings, wherein:

FIG. 1A is a side elevational view of an embodiment of a machine screw according to the present invention, wherein the machine screw is in a first position, and includes a side elevational view of a thin rod for use in deforming the machine screw from said first position into a second position;

FIG. 1B is a side elevational view of the embodiment of FIG. 1, wherein the machine screw is in said second position;

FIG. 1C is a cross sectional view of the embodiment of FIG. 1B along line C—C;

FIG. 2A is a side elevational view of another embodiment of the machine screw of FIG. 1 after it has been seated in a correspondingly threaded aperture (not shown) and having a first length of an axially extending slot;

FIG. 2B is a side elevational view of another embodiment of the machine screw of FIG. 1 after it has been seated in a correspondingly threaded aperture (not shown) and having a second length of an axially extending slot;

FIG. 2C is a side elevational view of another embodiment of the machine screw of FIG. 1 after it has been seated in a correspondingly threaded aperture (not shown) and having a third length of an axially extending slot;

FIG. 2E is a shank-end elevational view of the embodiment of FIG. 1 after it has been seated in a correspondingly threaded aperture (not shown);

FIG. 2F is a shank-end elevational view of another embodiment of the machine screw of FIG. 1 after it has been seated in a correspondingly threaded aperture (not shown);

FIG. 2G is a shank-end elevational view of another embodiment of the machine screw of FIG. 1 after it has been seated in a correspondingly threaded aperture (not shown), having three shank legs;

FIG. 2H is a head-end elevational view of the embodiment of FIG. 1;

FIG. 2J is a head-end elevational view of another embodiment of the machine screw of FIG. 1;

FIG. 2K is a head-end elevational view of another embodiment of the machine screw of FIG. 1;

FIG. 3A is a side elevational view of another embodiment of a machine screw according to the present invention, wherein the machine screw is in a first position;

FIG. 3B is a side elevational view of the embodiment of FIG. 3A, wherein the machine screw is in a second position;

FIG. 3C is a cross sectional view of the embodiment of FIG. 3A along line C—C;

FIG. 4A is a side elevational view of another embodiment of a machine screw according to the present invention, wherein the machine screw is in a first position, prior to insertion into a correspondingly threaded aperture (not shown);

FIG. 4B is a side elevational view of the embodiment of FIG. 4A, wherein the machine screw is in a second position, after insertion into said aperture;

FIG. 4C is a cross sectional view of the embodiment of FIG. 4B along line C—C;

FIG. 6A is a side elevational view of another embodiment of a machine screw according to the present invention, wherein the machine screw is in a first position, prior to insertion into a correspondingly threaded aperture (not shown);

FIG. 6B is a side elevational view of the embodiment of FIG. 6A, wherein the machine screw is in a second position, after insertion into said aperture;

FIG. 6C is a cross sectional view of the embodiment of FIG. 6B along line C—C;

FIG. 7A is a side elevational view of another embodiment of a machine screw according to the present invention, wherein the machine screw is in a first position, prior to insertion into a correspondingly threaded aperture (not shown);

FIG. 7B is a side elevational view of the embodiment of FIG. 7A, wherein the machine screw is in a second position, after insertion into said aperture;

FIG. 7C is a cross sectional view of the embodiment of FIG. 7B along line C—C;

FIG. 8A is a side elevational view of another embodiment of a machine screw according to the present invention, wherein the machine screw is in a first position prior to insertion into a correspondingly threaded aperture (not shown);

FIG. 8B is a side elevational view of the embodiment of FIG. 8A, wherein the machine screw is in a second position, during insertion into said aperture;

FIG. 8C is a cross sectional view of FIG. 8B along line C—C;

FIG. 9A is a side elevational view of another embodiment of a machine screw according to the present invention, wherein the machine screw is in a first position prior to insertion into a correspondingly threaded aperture (not shown);

FIG. 9B is a side elevational view of the embodiment of FIG. 9A, wherein the machine screw is in a second position, during insertion into said aperture;

FIG. 9C is a side elevational view of the embodiment of FIG. 9B along line C—C;

FIG. 12A is a side elevational view of another embodiment of a machine screw according to the present invention, wherein the machine screw is in a first position prior to insertion into a correspondingly threaded aperture (not shown);

FIG. 12B is a side elevational view of the embodiment of FIG. 12A, wherein the machine screw is in a second position, during insertion into said aperture;

FIG. 12C is a side elevational view of the embodiment of FIG. 12A, along line C—C;

FIG. 13A is a side elevational view of another embodiment of a machine screw according to the present invention, wherein the machine screw is in a first position prior to insertion into a correspondingly threaded aperture (not shown);

FIG. 13B is a side elevational view of the embodiment of FIG. 13A, wherein the machine screw is in a second position, during insertion into said aperture; and FIG. 13C is a side elevational view of the embodiment of FIG. 13A, along line C—C.

DETAILED DESCRIPTION OF VARIOUS EMBODIMENTS

Figure 2D:
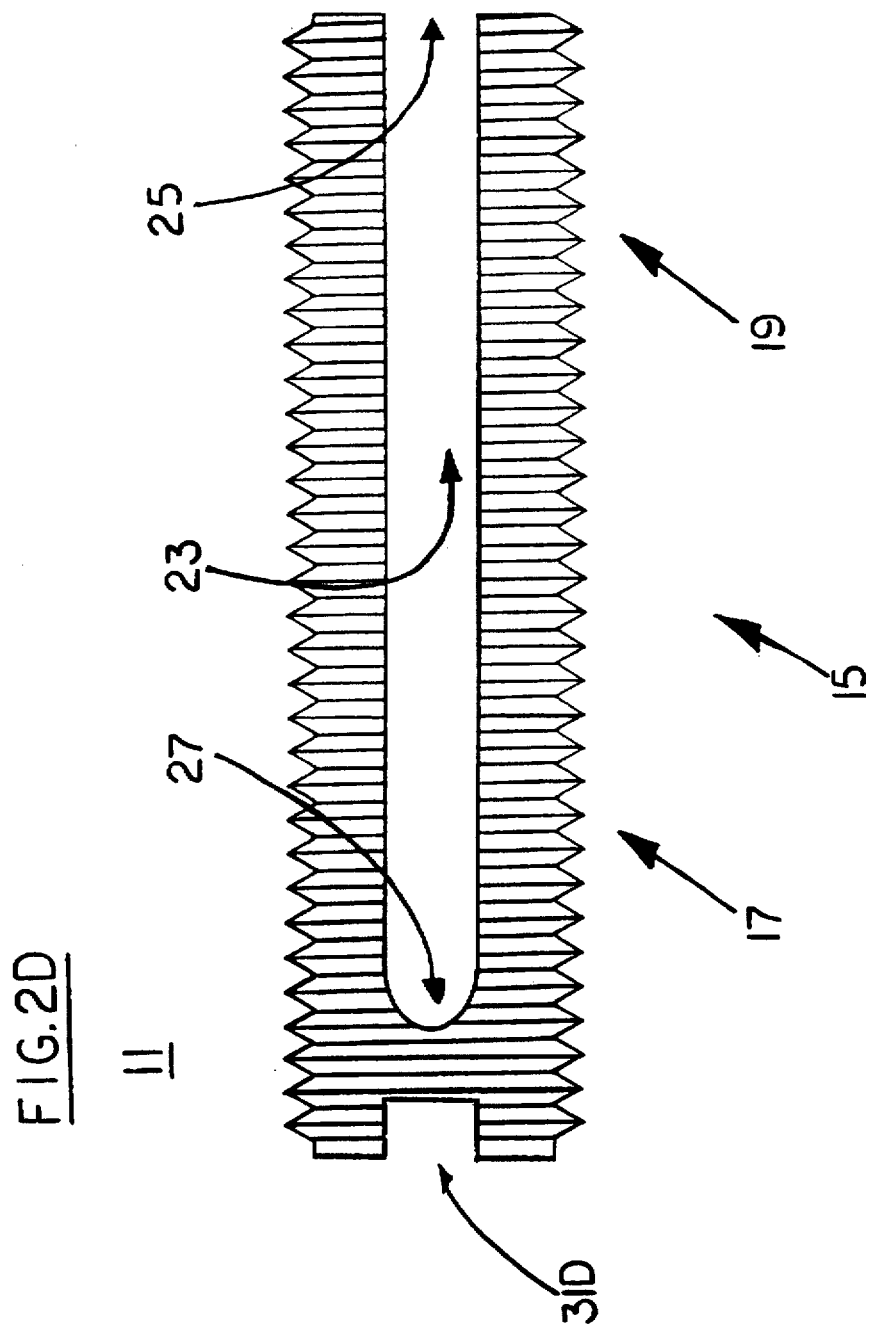
FIG. 2D is a side elevational view of another embodiment of the machine screw of FIG. 1 after it has been seated in a correspondingly threaded aperture (not shown) and substantially similar to the embodiment of FIG. 2A but without a head.

The present invention comprises an improved machine screw for engaging a cylindrical correspondingly threaded aperture. The machine screw of the present invention comprises a substantially cylindrical shank, including a proximal portion and a distal portion. A head adapted to be rotated may be formed on a shank proximal end opposite the shank distal portion, such that the shank extends axially therefrom, with a shank distal end opposite the head. At least a portion of the shank includes threads on the surface thereof for engaging said correspondingly threaded aperture. The shank is deformable from a first position to a second position, for either (1) minimizing the contacting surface area between corresponding threads of the shank and said aperture, and thereby allowing the machine screw to be easily insertable into, and extractable from, said correspondingly threaded aperture, or (2) maximizing the contacting surface area between the corresponding threads of the shank and said aperture after the shank has been fully inserted into said aperture, and thereby making the hold between the screw and said aperture more secure. Such deformation of the screw occurs during its insertion into said aperture. Furthermore, the screw may be formed of a resilient material, for allowing it to deform again as it is extracted from said aperture, and even to reform into its original shape after it has been extracted from said aperture. The shank further includes an elongate, open-sided slot extending axially from the shank distal end toward the shank proximal end, for dividing at least a portion of the shank into at least two elongate shank legs. The slot further includes a distal end which may be open, and a proximal end which may be closed. Various embodiments of the invention are illustrated in the appended drawings and described in greater detail, below. (All like numerical designations in the figures represent the same or similar elements.)

In FIGS. 1A, 1B and 3A through 7C are illustrated various embodiments of the machine screw according to the instant invention having a first position wherein the least outside diameter of the threads of the screw shank distal portion is smaller than the corresponding inner diameter of a cylindrical correspondingly threaded aperture into which said shank may be inserted, and wherein the outside diameter of the shank proximal portion is larger than the inner diameter of said threaded aperture, for allowing the shank to be inserted at least part way into said aperture via applying a distally oriented, non-rotating axial force against the head of the screw after the shank distal end has been placed into an open end of said aperture, because the contacting surface area between the corresponding threads of the shank and said aperture has been substantially minimized. These same embodiments are also deformable into a second position, wherein opposite sides of the screw shank and confronting faces or sides of an elongate slot extending axially through the shank are substantially parallel, and the outside diameter of the threads of the shank distal portion is larger than the inner diameter of said threaded aperture, for allowing full engagement between the corresponding threads of the shank and said aperture after the shank has been fully inserted into said aperture.

FIGS. 1A, 1B and 1C illustrate an initial embodiment of a machine screw 11 according to the present invention, for use in engaging a correspondingly threaded aperture (not shown), which aperture is substantially cylindrical. The machine screw 11 includes a head 13 adapted to be rotated, and a substantially cylindrical shank 15 connected to the head 13 and extending axially therefrom. The shank 15 has a proximal portion 17 adjacent to the head 13, and a distal portion 19 with a distal end 21 opposite the head 13, each of which portions may be of various lengths relative to the other. At least a portion of the shank 15 includes threads on the surface thereof formed in a fashion such as that which is known, for engaging said correspondingly threaded aperture. The shank 15 further includes an elongate, open-sided slot 23 extending axially from a slot open end 25 at the shank distal end 21 and through at least the shank distal portion 19 to a slot closed end 27, dividing at least the shank distal portion 19 into two semi-cylindrical shank legs or halves 29. Two substantially planar confronting shank-half faces 29F, one on either side of the axis of the shank 15, further define the slot 23.

The shank 15 is formed initially in a first position (illustrated in FIG. 1A) wherein the least outside diameter D1 of the threads of the shank distal portion 19 is smaller than the corresponding inner diameter of said threaded aperture, and wherein the outside diameter P1 of the shank proximal portion 17 is larger than the inner diameter of said threaded aperture. For purposes of clarifying the illustration, the outside diameter of the threads of the shank 15 is defined as the distance from the outside edge of a thread segment on one shank half 29, to the outside edge of a thread segment on the other shank half 29 directly opposite the shank 15 axis; and, the inner diameter of the threaded aperture is defined as the minimum distance between the inside edge of aperture threads on opposite sides of the aperture axis. In this first position, the distance between the confronting faces 29F of the slot 23 is smaller at the slot open end 25 than at the slot closed end 27. In operation, having the diameter D1 of the shank distal end 21 smaller than the inner diameter of said aperture allows for the shank 15 to be inserted into said aperture via applying a distally oriented, non-rotating axial force against the head 13 after the shank distal end 21 has been placed into an open end of said aperture. Such non-rotating or sliding insertion is available when the shank 15 is in said first position because the contacting surface area between the corresponding threads of the shank 15 and said aperture has been substantially minimized.

The shank 15 is deformable into a second position (illustrated in FIG. 1B), for increasing the contacting surface area between the corresponding threads of the shank 15 and said aperture once the shank 15 has been inserted into said aperture. In said second position, opposite sides 29S on the exterior surface of the shank halves 29 and confronting faces 29F are substantially parallel, and the outside diameter D2 of the threads of the shank distal portion 19 is larger than the inner diameter of said threaded aperture, for allowing full engagement between the corresponding threads of the shank 15 and said aperture. In the machine screw 11, such deformation occurs through the use of a thin rod 33 having a diameter substantially equivalent to the distance between confronting faces 29F when the shank 15 is in said second position. The rod 33 is preferably cylindrical; however, it may be fashioned into various shapes for more fully corresponding to the shape of the slot 23 when said slot 23 is in the second position. An axial bore 35 is further provided, extending along the axis of the screw 11 between the slot 23 closed end 27 and the proximal end of the head 13, for allowing insertion of said rod 33 therethrough and into the slot 23. As the rod 33 is inserted distally through the bore 35 and the slot 23, each of the shank halves 29 is thereby forced apart and away from the axis of the shank 15 in a radially oriented direction relative to said axis, placing the shank 15 into said second position. It has been found, that movement of the shank 15 into said second position causes a proper seating of the threads of the screw 11 within corresponding threads of the aperture in which the screw 11 is inserted.

It is preferred that the rod 33 is substantially equivalent in length to the shank 15, for allowing said rod 33 to be inserted entirely into the shank 15, and thereby eliminating the ability to remove the rod 33 apart from the removal of the screw 11. In this fashion, the rod 33 must be extracted from the aperture in which the screw 11 is inserted, simultaneously with the screw 11 by rotating the screw 11 in the extractable direction. It is also preferred that the rod 33 include a pointed distal end 37 for initial insertion into the bore 35, and for use as a wedge in moving the shank halves 29 into the second position. It is further preferred that the rod 33 include a substantially flat proximal end 39, to which a hammer may be applied for supplying the required insertion force. Due to the amount of force which may need to be translated through the rod 33, it is preferred that the rod 33 be made of a semi-rigid metal such as steel, although those skilled in the art will recognize other materials from which the rod 33 may be made in accordance with the instant invention. It is anticipated that headless nails of a size which is common will be used as appropriate rods 33.

FIGS. 2A, 2B, 2C, 2D, 2E, 2F, 2G, 2H, 2J, and 2K illustrate various other ways in which the screw 11 may be formed. In the embodiments of the screw 11 illustrated in FIGS. 1A, 1B and 1C, the slot 23 extends from its open end 25 entirely through the shank 15 to its closed end 27, which is formed by the distal end of the head 13. This allows for the shank halves 29 to be deformable along substantially their entire length, restricted primarily by the rigidity of the material from which the shanks are made, and resulting in the least amount of contacting surface area between the threads of the shank 15 and an aperture into which it is inserted during such insertion. In the embodiment of the screw 11 which is illustrated in FIG. 2A, the slot 23 extends from its open end 25 through the entire shank distal portion 19 and through most, but not all, of the shank proximal portion 17. This allows for each shank half 29 to have a lesser degree of deformation than that which is available in the embodiment of FIGS. 1A, 1B and 1C, resulting in a conversely greater amount of contacting surface area between the threads of the shank 15 and the corresponding threads of an aperture into which the shank 15 is inserted during such insertion, meaning that some rotation of the shank 15 may be required for full insertion of said shank 15 into said aperture. In the embodiments of the screw 11 illustrated in FIGS. 2B and 2C, the slot 23 extends through the entire shank distal portion 19 and through various lesser lengths of the shank proximal portion 17, for providing even lesser degrees of deformation to the shank 15.

The embodiment of the screw 11 illustrated in FIG. 2D shows that when the slot 23 extends only partially through the length of the proximal portion 17 (as in the embodiment of FIGS. 2A, 2B, and 2C), there may be no need for a head on the screw 11. Instead of a head, the proximal end 17E of the screw 11 is formed in a substantially flat plane perpendicular to the screw 11 axis, to which a hammer may be applied for supplying an axially oriented force for inserting the screw 11 into at least a portion of a correspondingly threaded aperture. In this embodiment of the screw 11, there is also provided a diametrical slot 31D in the proximal end 17E, for allowing the screw 11 to be rotated with a straight blade type screw driver for further insertion into, or extraction from, said aperture. Those skilled in the art will recognize that various lengths of the slot 23 other than that illustrated in FIG. 2D, and that various other forms of the slot 31D, may be provided in this embodiment of the screw 11 according to the instant invention.

The embodiment of the screw 11 illustrated in FIG. 2E shows that the slot 23 may be shaped cross sectionally in various forms, for dividing the shank 15 into more than two shank legs 29. The embodiment of screw 11 illustrated in FIG. 2E comprises a head 13, a substantially cylindrical shank 15 and a tri-walled slot 23 dividing the shank 15 into three shank legs 29, which are deformable from the first position to the second position by a rod 33, as described above. This embodiment of the screw 11 allows for less contacting surface area between the threads of the shank 15 and the corresponding threads of an aperture into which the screw 11 may be inserted.

As illustrated in FIGS. 2F and 2G, different cross-sectional profiles of the shank 15 may be used in the screw 11, for varying both the amount of contacting surface area available between the threads of the shank 15 and a corresponding aperture into which the shank 15 may be inserted, and the degree of deformability which is available to the shank legs 29. In FIG. 2F, both the shank 15 and the head 13 have a substantially circular cross-sectional profile, with the slot 23 dividing said profile of shank 15 into two substantially equivalent semi-circular halves. In the embodiment of FIG. 2G, however, the cross-sectional profile of the shank 15 has been modified by essentially removing a segment of the shank 15 on each end of the slot 23. Said removed segment is defined substantially by a line segment parallel to a tangent to the shank 15 which touches the shank 15 at the radial center of the slot 23 relative to the shank axis, said line segment intersecting the slot 23 between the shank 15 axis and an open side of the slot 15, and further intersecting the outside surface of the shank 15 at each end of said line segment. A screw 11 having the cross-sectional profile of the embodiment of FIG. 2G has along the length of its slot 23 a lesser surface area for contacting an inner wall of an aperture into which the screw 11 may be inserted than that which is available with the embodiment of the screw 11 illustrated in FIG. 2F. Those skilled in the art will recognize various other cross-sectional profiles in which the screw shank of the instant invention may be formed.

Additionally, FIGS. 2H, 2J and 2K illustrate various ways in which the head 13 of the screw 11 may be adapted for rotating. In FIG. 2H, a diametrical slot 31D (also illustrated in FIGS. 1C and 2D) is provided in a semi-spherical embodiment of the head 13, for allowing rotation by a straight headed screw-driver. In FIG. 2J, an X type slot 31X is provided in another semi-spherical embodiment of the head 13 for allowing rotation by a Philips type screw-driver. In FIG. 2K, a substantially flat and hexagonally shaped embodiment of the head 13 is provided for use with a correspondingly shaped wrench. Those skilled in the art will recognize still other ways the head 13 of the instant invention may be adapted for rotation.

It will be apparent to those skilled in the art that the screw 11 of the present invention may be made of a variety of materials, including those which are common with machine screws and fasteners. However, it is preferred that the screw 11 is made of a resilient material such as nylon, for allowing the screw 11 to reform naturally into its original shape (i.e., said first position) when the rod 33 is extracted therefrom. Such an embodiment of the screw 11 will allow the screw 11 to be extracted from a correspondingly threaded aperture with minimal force, and further allow said screw 11 to be reinserted thereafter. Similarly, it may be desirous to have the screw 11 formed of a semi-flexible metal, for an application needing a durable fastener with greater rigidity. Also, one embodiment similar to that illustrated in FIGS. 2B and 2C, may include a distal section 19 made of a flexible material (such as nylon) affixed along line Z—Z to a proximal section 17 formed of a metal, for combining the durable rigidity of metal with the flexibility of a plastic type material.

Illustrated in FIGS. 3A, 3B and 3C is another embodiment of a machine screw 111 according to the instant invention, for use in engaging a correspondingly threaded aperture (not shown), which aperture is substantially cylindrical. The screw 111 is very similar to the screw 11, in that it includes a head 113 adapted to be rotated, and a substantially cylindrical shank 115 connected to the head 113 and extending axially therefrom. The shank 115 has a proximal portion 117 adjacent to the head 113, and a distal portion 119 with a distal end 121 opposite the head 113, each of which portions may be of various lengths relative to the other. At least a portion of the shank 115 includes threads on the surface thereof formed in a fashion such as that which is known, for engaging said correspondingly threaded aperture. The shank 115 further includes an elongate, open-sided slot 123 extending axially from a slot open end 125 at the shank distal end 121 and through at least the shank distal portion 119 to a slot closed end 127, dividing at least the shank distal portion 119 into two semi-cylindrical shank legs or halves 129. Two substantially planar confronting shank-half faces 129F, one on either side of the axis of the shank 115, further define the slot 123.

The shank 115 is formed initially into a first position (illustrated in FIG. 3A) wherein the least outside diameter D11 of the threads of the shank distal portion 119 is smaller than the inner diameter of said threaded aperture for non-rotating or sliding insertion therein, and wherein the outside diameter P11 of the shank proximal portion 117 is larger than the inner diameter of said threaded aperture, for allowing full engagement between the corresponding threads of the shank 115 and said aperture, the outside diameter of the shank 115 and the inner diameter of the correspondingly threaded aperture being defined as substantially similar to the corresponding outside diameter of the shank 15 of the screw 11 and the inner diameter of the correspondingly threaded aperture associated with the screw 11. In this first position, the distance between the confronting faces 129F of the slot 123 is smaller at the slot open end 125 than at the slot closed end 127. The exterior shape of the shank 115 in the first position allows for relatively easy insertion into a correspondingly threaded aperture, since the contacting surface area between the threads of the shank 115 and those of said aperture is substantially minimized.

Like the shank 15, in order that the contacting surface area between the corresponding threads of the shank 115 and the associated aperture may be increased after the shank 115 is inserted into said aperture, the shank 115 is deformable into a second position (illustrated in FIG. 3B). In said second position, opposite sides 129S on the exterior surface of the shank halves 129, and the confronting faces 129F are substantially parallel, and the least outside diameter D12 of the threads of the shank distal portion 119 is larger than the inner diameter of said threaded aperture, for allowing full engagement between the threads of the shank 115 and said aperture. In the machine screw 111, such deformation occurs through the use of a thin rod 133 substantially similar to the rod 33 associated with the screw 11, having a diameter substantially equivalent to the distance between confronting faces 129F when the shank 115 is in said second position. An axial bore 135 is further provided in the screw 111, extending axially between the slot closed end 127 and the proximal end of the head 113, for allowing the insertion of said rod 133 therethrough and into the slot 123. As the rod 133 is inserted distally through the bore 135 and the slot 123, each of the shank halves 129 is forced apart from the axis of the shank 115 in a radially oriented direction relative to said axis, placing the shank 115 into said second position. It has been found, that movement of the shank 129 into said second position causes a proper seating of the threads of the screw 111 within corresponding threads of said aperture.

Additionally, the shank 115 includes a bridge 141 connected via a living hinge to the distal end 121 of one of the shank halves 129. The bridge 141 extends proximally into the slot 123 from the distal end 121 of the shank half 129 to which it is connected, and is movable in a rotating fashion about the point at which it is connected to the shank half 129 and distally, away from the head 113, by pressure applied thereto through insertion of the rod 133 distally into the slot 123. It is preferred that the length of the bridge 141 is sufficient for engaging either the face 129F of the opposite shank half 129, or the opposite interior surface of the aperture in which the screw 111 is inserted, when the shank 115 is moved into the second position. This allows for locking the shank 115 into the second position, such as may be desirable when using a rod 133 that is made substantially longer than the screw 111 for removal from said screw after insertion of the screw 111. It is preferred that the bridge 141 is similarly movable in a proximal direction toward the head 113 after the screw 111 is extracted from said aperture, so that the screw 111 may be fully reusable.

As with the machine screw 11, it will be apparent to those skilled in the art that the screw 111 of the present invention may be made of a variety of materials, including those which are common with machine screws and fasteners. For example, it may be desirable that the screw 111 be made of a resilient material such as nylon, for allowing the screw 111 to reform naturally into its original shape when the rod 133 is extracted from the slot 123, for allowing relatively easy removal of the screw 111 from an aperture in which it has been inserted. Similarly, it may be desirous to have the screw 111 formed of a semi-flexible metal, for an application needing a durable fastener with greater rigidity. Also, one embodiment similar to that illustrated in FIGS. 2B and 2C, may include a distal section 119 made of a flexible material (such as nylon) affixed along line Z—Z to a proximal section 117 formed of a metal, for combining the durable rigidity of metal with the flexibility of a plastic type material. Additionally, the slot 123 and head 113 of the screw 111 may be formed in various other fashions according to the instant invention, such as fashions substantially similar to those of the screw 11 illustrated in FIGS. 2A, 2B, 2C, 2D, 2E, 2F, 2G, 2H, 2J, and 2K and described above.

Illustrated in FIGS. 4A, 4B and 4C is another embodiment of a machine screw 211 according to the instant invention, for use in engaging a correspondingly threaded aperture (not shown), which aperture is substantially cylindrical. While screws 11 and 111 are designed for use with correspondingly threaded apertures having either two open ends or a singular open end in combination with an aperture longer than the screw shank, the screw 211 is designed for use only with correspondingly threaded apertures having one closed end and one open end. The screw 211 is very similar to the screw 111, in that it includes a head 213 adapted to be rotated, and a substantially cylindrical shank 215 connected to the head 213 and extending axially therefrom. The shank 215 has a proximal portion 217 adjacent to the head 213, and a distal portion 219 with a distal end 221 opposite the head 213, each of which portions may be of various lengths relative to the other. At least a portion of the shank 215 includes threads on the surface thereof formed in a fashion such as that which is known, for engaging said correspondingly threaded aperture. The shank 215 further includes an elongate, open-sided slot 223 extending axially from a slot open end 225 at the shank distal end 221 and through at least the shank distal portion 219 to a slot closed end 227, dividing at least the shank distal portion 219 into two semi-cylindrical shank legs or halves 229. Two substantially planar confronting shank-half faces 229F, one on either side of the axis of the shank 215, further define the slot 223.

The shank 215 is formed initially into a first position (illustrated in FIG. 4A) wherein the least outside diameter D21 of the threads of the shank distal portion 219 is smaller than the inner diameter of said threaded aperture for non-rotating or sliding insertion therein, and wherein the outside diameter P21 of the shank proximal portion 217 is larger than the inner diameter of said threaded aperture, for allowing full engagement between the corresponding threads of the shank 215 and said aperture, the outside diameter of the shank 215 and the inner diameter of said threaded aperture being defined as substantially similar to the corresponding outside diameter of the shank 15 and the inner diameter of the correspondingly threaded aperture associated with the screw 11. In said first position, the distance between the confronting faces 229F of the slot 223 is smaller at the slot open end 225 than at the slot closed end 227. The exterior shape of the shank 215 when in this first position allows for relatively easy insertion into said correspondingly threaded aperture, since the contacting surface area between the threads of the shank 215 and those of said aperture is substantially minimized.

Like the shank 115, in order that the contacting surface area between the corresponding threads of the shank 215 and said aperture may be increased after the shank 215 is inserted into said aperture, the shank 215 is deformable into a second position (illustrated in FIG. 4B). In said second position, opposite sides 229S on the exterior surface of the shank halves 229, and the confronting faces 229F are substantially parallel, and the least outside diameter D22 of the threads of the shank distal portion 219 is larger than the inner diameter of said threaded aperture, for allowing full engagement between the threads of the shank 215 and said aperture. Unlike the screws 11 and 111, such deformation of the machine screw 211 does not occur through the use of a rod inserted into the slot 223 through a head axial bore like the bore 35 of the screw 11, but rather occurs through cooperation with a closed end of an aperture into which it is inserted.

Like the screw 111, the shank 215 includes a bridge 241 connected via a living hinge to the distal end 221 of one of the shank halves 229. Instead of extending into the slot 223 in similar fashion to the bridge 141 of the screw 111, however, the bridge 241 extends distally from the distal end 221 of the shank half 229 to which it is connected, for engaging the closed end of an aperture into which it is inserted. The bridge 241 is movable in a rotating fashion about the point at which it is connected to the shank half 229 and toward the shank proximal portion 217, by a proximally oriented pressure applied thereto. Such pressure against the bridge 241 is provided by said aperture closed end in reaction to a distally oriented insertion force applied against the screw head 213 and translated through the shank 215 as the screw 211 is inserted into said aperture and the shank distal end 221 contacts said aperture closed end. Such insertion force may be applied during the non-rotating or sliding portion of the insertion, during the rotating portion of said insertion, or both. When the screw 211 is thus inserted, the bridge 241 comes into contact with said aperture closed end, at which time the distally oriented insertion force against the head 213 is translated through said aperture closed end into said proximally oriented force, and is then applied against the bridge 241 in a direction opposite the insertion force. The proximally oriented force moves the bridge 241 about the point at which it is connected to the shank half 229 in a proximal direction toward the head 213 until such time as the insertion force stops, or the bridge 241 abuts the distal end 221 of the opposite shank half 229, or the distal end 221 of each shank half 229 abuts the inner surface of said aperture.

During such rotational movement of the bridge 241, a portion of said proximal force is further translated through the bridge 241 into a radially oriented force relative to the shank 215 axis and against the distal end of the shank half 229 to which the bridge 241 is connected, for moving said shank half 229 away from the axis of the shank 215 and toward the inner surface 246 of the aperture 240, for allowing the threads of said shank half 229 to fully engage the corresponding threads of the aperture inner surface 246. It has been found, that movement of the shank half 229 into said second position causes a proper seating of the threads of the screw 211 within corresponding threads of the aperture 240. Like the screw 111, it is preferred that the length of the bridge 241 is sufficient for allowing the distal end 221 of the bridge 241 to engage either the distal end of the opposite shank half 229 or the opposite inner surface 246 of the aperture 240 when the screw 211 is moved into the second position, whereby the shank 215 may be locked into said second position.

15

As with the machine screw 11, it will be apparent to those skilled in the art that the screw 211 of the present invention may be made of a variety of materials, including those which are common with machine screws and fasteners. For example, it may be desirable that the screw 211 is made of a resilient material such as nylon, for allowing the screw 211 to reform naturally into its original shape when the screw 211 is rotated in a direction suitable for extraction and the screw 211 is thereby moved a distance from said aperture closed end, for allowing relatively easy removal of the screw 211 from said aperture. Similarly, it may be desirous to have the screw 211 formed of a semi-flexible metal, for an application needing a durable fastener with greater rigidity. Also, one embodiment similar to that illustrated in FIGS. 2B and 2C, may include a distal section 219 made of a flexible material (such as nylon) affixed along line Z—Z to a proximal section 217 formed of a metal, for combining the durable rigidity of metal with the flexibility of a plastic type material. Additionally, the slot 223 and head 213 of the screw 211 may be formed in various other fashions according to the instant invention, such as fashions substantially similar to those of the screw 11 illustrated in FIGS. 2A, 2B, 2C, 2D, 2E, 2F, 2G, 2H, 2J, and 2K and described above.

Figure 5A:
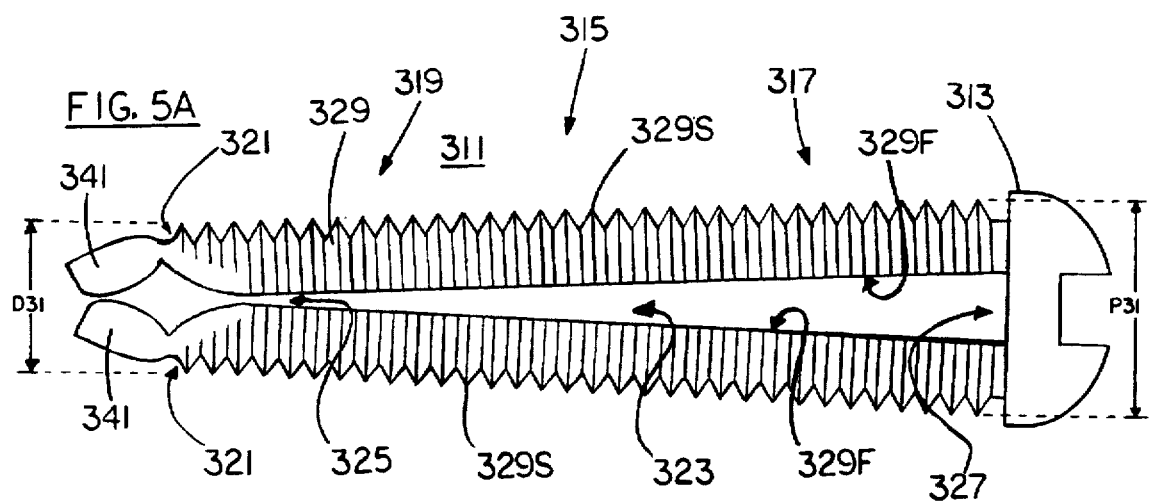
FIG. 5A is a side elevational view of another embodiment of a machine screw according to the present invention, wherein the machine screw is in a first position, prior to insertion into a correspondingly threaded aperture (not shown)
Figure 5B:
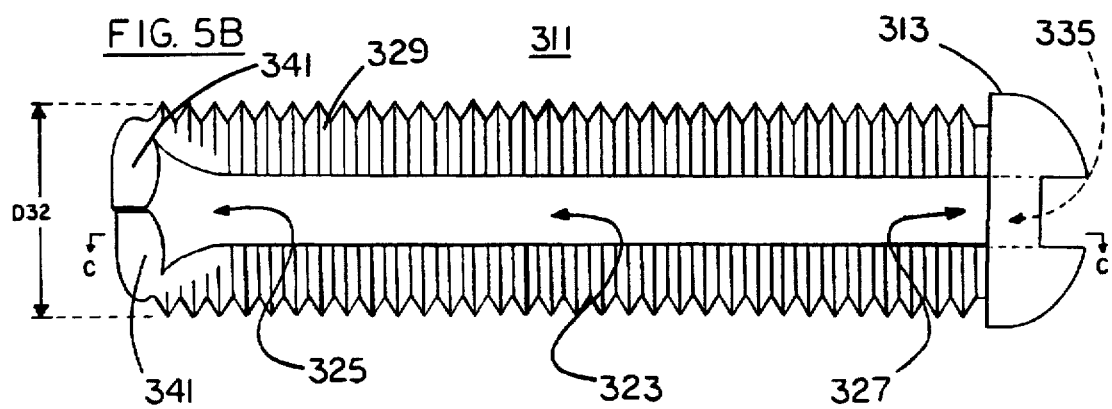
FIG. 5B is a side elevational view of the embodiment of FIG. 5A, wherein the machine screw is in a second position, after insertion into said aperture.
Figure 5C:
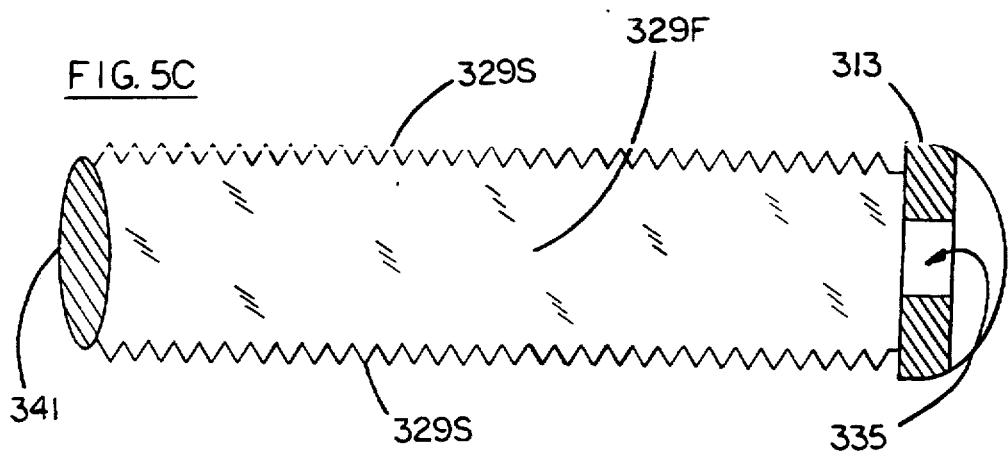
FIG. 5C is a cross sectional view of the embodiment of FIG. 5B along line C—C.

Illustrated in FIGS. 5A, 5B and 5C is another embodiment of a machine screw 311 according to the instant invention which is similar to the screw 211, for use in engaging a correspondingly threaded aperture, which aperture is substantially cylindrical. Like the screw 211, the screw 311 is designed for use only with correspondingly threaded apertures having substantially the same length as the shank of the screw 511, with one closed end and one open end. The screw 311 includes a head 313 adapted to be rotated, and a substantially cylindrical shank 315 connected to the head 313 and extending axially therefrom. The shank 315 has a proximal portion 317 adjacent to the head 313, and a distal portion 319 with a distal end 321 opposite the head 313, each of which portions may be of various lengths relative to the other. At least a portion of the shank 315 includes threads on the surface thereof formed in a fashion such as that which is known, for engaging said correspondingly threaded aperture. The shank 315 further includes an elongate, open-sided slot 323 extending axially from a slot open end 325 at the shank distal end 321 and through at least the shank distal portion 319 to a slot closed end 327, dividing at least the shank distal portion 319 into two semi-cylindrical shank legs or halves 329. Two substantially planar confronting shank-half faces 329F, one on either side of the axis of the shank 315, further define the slot 323.

The shank 315 is formed initially into a first position (illustrated in FIG. 5A) wherein the least outside diameter D31 of the threads of the shank distal portion 319 is smaller than the inner diameter of said threaded aperture for non-rotating or sliding insertion therein, and wherein the outside diameter P31 of the shank proximal portion 317 is larger than the inner diameter of said threaded aperture, for allowing full engagement between the corresponding threads of the shank 315 and said aperture, the outside diameter of the shank 315 and the inner diameter of said aperture being defined as substantially similar to the corresponding outside diameter of the shank 15 and the inner diameter of the correspondingly threaded aperture associated with the screw 11. In said first position, the distance between the confronting faces 329F of the slot 323 is smaller at the slot open end 325 than at the slot closed end 327. The exterior shape of the shank 315 when in this first position, allows for relatively easy insertion into said correspondingly threaded aperture, since the contacting surface area between the threads of the shank 315 and those of said aperture is substantially minimized.

16

Like the shank 215, in order that the contacting surface area between the corresponding threads of the shank 315 and said aperture may be increased after the shank 315 is inserted into said aperture, the shank 315 is deformable into a second position (illustrated in FIG. 5B). In said second position, opposite sides 329S on the exterior surface of the shank halves 329, and the confronting faces 329F are substantially parallel, and the least outside diameter D32 of the threads of the shank distal portion 319 is larger than the inner diameter of said threaded aperture, for allowing full engagement between the threads of the shank 315 and said aperture. Like the screw 211, such deformation of the machine screw 311 occurs through cooperation with the closed end of said aperture.

The shank 315 includes a bridge 341 connected via a living hinge to the distal end 321 of each of the shank halves 329, such that each shank half 329 is connected at its distal end 321 to the proximal end of a corresponding bridge 341. Each bridge 341 extends distally from the distal end 321 of the shank half 329 to which it is connected, for engaging the closed end of said correspondingly threaded aperture. Like the bridge 241 of the screw 211, each bridge 341 is movable in a rotating fashion about the point at which it is connected to the associated shank half 329 and toward the shank proximal portion 317, by a proximally oriented pressure applied thereto. Such pressure against the bridge 341 is provided by said aperture closed end in reaction to a distally oriented insertion force applied against the head 313 and translated through the shank 315 as the screw 311 is inserted into said aperture and the shank distal end 321 contacts said aperture closed end. Such insertion force may be applied during the non-rotating or sliding portion of the insertion, during the rotating portion of said insertion, or both. When the screw 311 is thus inserted, each bridge 341 comes into contact with said aperture closed end, at which time the distally oriented insertion force against the head 313 is translated through said aperture closed end into said proximally oriented force, and is then applied against each bridge 341 in a direction opposite the insertion force. The proximally oriented force moves each bridge 341 about the point at which it is connected to the associated shank half 329 in a proximal direction toward the head 313 until such time as the insertion force stops, or each bridge 341 abuts the distal end of the opposite bridge 341, or the shank distal end 321 abuts the inner surface of said aperture.

During such rotational movement of each bridge 341, a portion of said proximal force is further translated through each bridge 341 into a radially oriented force relative to the shank 315 axis and against the distal end 321 of the shank half 329 to which each bridge 341 is connected, for moving said shank half 329 away from the axis of the shank 315 and toward the inner surface 346 of the aperture, for allowing the threads of said shank half 329 to fully engage the corresponding threads of the aperture inner surface. It has been found, that movement of the shank halves 329 into said second position causes a proper seating of the threads of the screw 311 within corresponding threads of said aperture. It is preferred that the length of each bridge 341 is sufficient for allowing the distal end of each bridge 341 to engage either the distal end of the opposite bridge 341 or the opposite interior surface of said aperture, whereby the shank 315 may be locked into the second position.

As with the machine screw 11, it will be apparent to those skilled in the art that the screw 311 of the present invention may be made of a variety of materials, including those which are common with machine screws and fasteners. For example, it may be desirable that the screw 311 be made of a resilient material such as nylon, for allowing the screw 311 to reform naturally into its original shape when the screw 311 is rotated in a direction suitable for extraction and the screw 311 is thereby moved a distance from said aperture closed end, for allowing relatively easy removal of the screw 311 from said aperture. Similarly, it may be desirous to have the screw 311 formed of a semi-flexible metal, for an application needing a durable fastener with greater rigidity. Also, one embodiment similar to that illustrated in FIGS. 2B and 2C, may include a distal section 319 made of a flexible material (such as nylon) affixed along line Z—Z to a proximal section 317 formed of a metal, for combining the durable rigidity of metal with the flexibility of a plastic type material. Additionally, the slot 323 and head 313 of the screw 311 may be formed in various other fashions in accordance with the instant invention, such as fashions substantially similar to those of the screw 11 illustrated in FIGS. 2A, 2B, 2C, 2D, 2E, 2F, 2G, 2H, 2J, and 2K and described above.

Illustrated in FIGS. 6A, 6B and 6C is another embodiment of a machine screw 411 according to the instant invention which is similar to the screw 311, for use in engaging a correspondingly threaded aperture, which aperture is substantially cylindrical. Like the screw 311, the screw 411 is designed for use only with correspondingly threaded apertures having substantially the same length as the shank of the screw 411, with one closed end and one open end. The screw 411 includes a head 413 adapted to be rotated, and a substantially cylindrical shank 415 connected to the head 413 and extending axially therefrom. The shank 415 has a proximal portion 417 adjacent to the head 413, and a distal portion 419 with a distal end 421 opposite the head 413, each of which portions may be of various lengths relative to the other. At least a portion of the shank 415 includes threads on the surface thereof formed in a fashion such as that which is known, for engaging said correspondingly threaded aperture. The shank 415 further includes an elongate, open-sided slot 423 extending axially from a slot open end 425 at the shank distal end 421 and through at least the shank distal portion 419 to a slot closed end 427, dividing at least a portion of the shank 415 into two semi-cylindrical shank legs or halves 429. Two substantially planar confronting shank-half faces 429F, one on either side of the axis of the shank 415, further define the slot 423.

The shank 415 is formed initially into a first position (illustrated in FIG. 6A) wherein the least outside diameter D41 of the threads of the shank distal portion 419 is smaller than the inner diameter of said threaded aperture for non-rotating or sliding insertion therein, and wherein the outside diameter P41 of the shank proximal portion 417 is larger than the inner diameter of said threaded aperture, for allowing full engagement between the corresponding threads of the shank 415 and said aperture, the outside diameter of the shank 415 and the inner diameter of said aperture being defined as substantially similar to the corresponding outside diameter of the shank 15 and the inner diameter of the correspondingly threaded aperture associated with the screw 11. In this first position, the distance between the confronting faces 429F of the slot 423 is smaller at the slot open end 425 than at the slot closed end 427. The exterior shape of the shank 415 when in this first position, allows for relatively easy insertion into said correspondingly threaded aperture, since the contacting surface area between the threads of the shank 415 and those of said aperture is substantially minimized.

Like the shank 315, in order that the contacting surface area between the corresponding threads of the shank 415 and said aperture may be increased once the shank 415 is inserted into said aperture, the shank 415 is deformable into a second position (illustrated in FIG. 6B). In said second position, opposite sides 429S on the exterior surface of the shank halves 429, and the confronting faces 429F are substantially parallel, and the least outside diameter D42 of the threads of the shank distal portion 419 is larger than the inner diameter of said threaded aperture, for allowing full engagement between the threads of the shank 415 and said aperture. Like the screws 211 and 311, such deformation of the machine screw 411 occurs through cooperation with the closed end of said aperture.

The shank 415 includes a single bridge 441 connected via a living hinge at each of two bridge ends 441E to the distal end 421 of each of the shank halves 429. The bridge 441 is divided substantially into two elongate bridge halves 441H, each of which is connected at a distal end to a similar distal end of the other bridge half 441H for forming a bridge center 441C of the bridge 441, and at a proximal end 441E to the distal end 421 of a shank half 429. The bridge 441 is bent in an angle at its center 441C, forming substantially a V shape, such that said center 441C extends distally from the distal end 421 of both shank halves 429, for engaging the closed end of said correspondingly threaded aperture. Like the bridge 341 of the screw 311, each bridge half 441H is movable in a rotating fashion about the point at which it is connected to the associated shank half 429, and about the bridge center 441C, toward the shank proximal portion 417 by a proximally oriented pressure applied thereto. Such pressure against the bridge 441 is provided by said aperture closed end in reaction to a distally oriented insertion force which is applied against the head 413 and translated through the shank 415 as the screw 411 is inserted into said aperture and the shank distal end 421 contacts said closed end. Such insertion force may be applied during the non-rotating or sliding portion of the insertion, during the rotating portion of said insertion, or both. When the screw 411 is thus inserted, the bridge center 441C comes into contact with said aperture closed end, at which time the distally oriented insertion force against the head 413 is translated through said aperture closed end into said proximally oriented force applied against the bridge center 441C in an opposite direction to the insertion force. The proximally oriented force then moves the bridge center 441C in a proximal direction toward the head 413 until such time as the insertion force stops, or each bridge half 441H abuts at its proximal end the inner surface of said aperture, or the shank distal end 421 of each shank half 429 abuts the inner surface of said aperture. During such movement, a portion of the proximal force is further translated through each bridge half 441H into a radially oriented force relative to the shank 415 axis and against the distal end 421 of the shank half 429 to which the bridge half 441H is connected, for moving said shank half 429 away from the axis of the shank 415 and toward the inner surface of said aperture, for allowing the threads of said shank half 429 to fully engage the corresponding threads of said aperture inner surface. It has been found, that movement of the shank halves 429 into said second position causes a proper seating of the screw 411 threads within corresponding threads of said aperture. It is preferred that the length of each bridge half 441H is such that the bridge 441 is formed into a substantially straight line when both shank halves 429 reach the position at which they are parallel to the inner surface of said aperture as described above, the screw 411 thus being in said second position. However, those skilled in the art will recognize that other lengths of each bridge half 441H may be sufficient for moving the shank 415 into a secure position within said aperture.

As with the machine screw 11, it will be apparent to those skilled in the art that the screw 411 of the present invention may be made of a variety of materials, including those which are common with machine screws and fasteners. For example, it may be desirable that the screw 411 be made of a resilient material such as nylon, for allowing the screw 411 to reform naturally into its original shape when the screw 411 is rotated in a direction suitable for extraction and the screw 411 is thereby moved a distance from said aperture closed end, for allowing relatively easy removal of the screw 411 from said aperture. Similarly, it may be desirous to have the screw 411 formed of a semi-flexible metal, for an application needing a durable fastener with greater rigidity. Also, one embodiment similar to that illustrated in FIGS. 2B and 2C, may include a distal section 419 made of a flexible material (such as nylon) affixed along line Z—Z to a proximal section 417 formed of a metal, for combining the durable rigidity of metal with the flexibility of a plastic type material. Additionally, the slot 423 and head 413 of the screw 411 may be formed in various other fashions in accordance with the instant invention, such as fashions substantially similar to those of the screw 11 illustrated in FIGS. 2A, 2B, 2C, 2D, 2E, 2F, 2G, 2H, 2J, and 2K and described above.

Illustrated in FIGS. 7A, 7B and 7C is another embodiment of a machine screw 511 according to the instant invention which is very similar to the screw 411, for use in engaging a correspondingly threaded aperture, which aperture is substantially cylindrical. Like the screws 211, 311 and 411, the screw 511 is designed for use only with correspondingly threaded apertures having substantially the same length as the shank of the screw 511, with one closed end and one open end. The screw 511 includes a head 513 adapted to be rotated, and a substantially cylindrical shank 515 connected to the head 513 and extending axially therefrom. The shank 515 has a proximal portion 517 adjacent to the head 513, and a distal portion 519 with a distal end 521 opposite the head 513, each of which portions may be of various lengths relative to the other. At least a portion of the shank 515 includes threads on the surface thereof formed in a fashion such as that which is known, for engaging said correspondingly threaded aperture. The shank 515 further includes an elongate, open-sided slot 523 extending axially from a slot open end 525 at the shank distal end 521 and through at least the shank distal portion 519 to a slot closed end 527, dividing at least a portion of the shank 515 into two semi-cylindrical shank legs or halves 529. Two substantially planar confronting shank-half faces 529F, one on either side of the axis of the shank 515, further define the slot 523.

The shank 515 is formed initially into a first position (illustrated in FIG. 7A) wherein the least outside diameter D51 of the threads of the shank distal portion 519 is smaller than the inner diameter of said correspondingly threaded aperture for non-rotating or sliding insertion therein, and wherein the outside diameter P51 of the shank proximal portion 517 is larger than the inner diameter of said threaded aperture, for allowing full engagement between the corresponding threads of the shank 515 and said aperture, the outside diameter of the shank 515 and the inner diameter of said aperture being defined as substantially similar to the corresponding outside diameter of the shank 15 and the inner diameter of said correspondingly threaded aperture associated with the screw 11. In this first position, the distance between the confronting faces 529F of the slot 523 is smaller at the slot open end 525 than at the slot closed end 527. The exterior shape of the shank 515 when in this first position, allows for relatively easy insertion into said correspondingly threaded aperture, since the contacting surface area between the threads of the shank 515 and those of said aperture is substantially minimized.

Like the shank 515, in order that the contacting surface area between the corresponding threads of the shank 515 and said aperture may be increased once the shank 515 is inserted into said aperture, the shank 515 is deformable into a second position (illustrated in FIG. 7B). In said second position, opposite sides 429S on the exterior surface of the shank halves 529, and the confronting faces 529F are substantially parallel, and the least outside diameter D52 of the threads of the shank distal portion 519 is larger than the inner diameter of said threaded aperture, for allowing full engagement between the threads of the shank 515 and said aperture. Like the screws 211, 311, and 411 such deformation of the machine screw 511 occurs through cooperation with the closed end of said aperture.

The shank 515 includes a compressible bridge 541 connected integrally to the distal end 521 of each of the shank halves 529 and formed in substantially a V shape having an apex 541C extending distally from the distal end 521 of both shank halves 529, for engaging the closed end of said correspondingly threaded aperture. The bridge 541 is compressible toward the shank proximal portion 517 by a proximally oriented pressure applied against the apex 541C. Such pressure against the bridge 541 is provided by said aperture closed end in reaction to a distally oriented insertion force applied against the screw head 513 and translated through the shank 515 as the screw 511 is inserted into said aperture and the shank distal end 521 contacts said aperture closed end. Such insertion force may be applied during the non-rotating or sliding portion of the insertion, during the rotating portion of said insertion, or both. When the screw 511 is thus inserted, the bridge apex 541 C comes into contact with the aperture closed end, at which time the distally oriented insertion force against the head 513 is translated through said aperture closed end into said proximally oriented force applied against the bridge apex 541C in an opposite direction to the insertion force. The proximally oriented force then compresses the bridge apex 541C in a proximal direction toward the head 513 until such time as the insertion force stops, or the distal end 521 of each shank half 529 abuts the inner surface of said aperture, or the bridge 541 is fully compressed. During such movement, a portion of the proximal force is further translated through the bridge 541 into a radially oriented force relative to the shank 515 axis and against the distal end 521 of each shank half 529, for moving said shank half 529 away from the axis of the shank 515 and toward the inner surface of said aperture, for allowing the threads of said shank half 529 to fully engage the corresponding threads of said aperture inner surface. It has been found, that movement of the shank halves 529 into said second position causes a proper seating of the screw 511 threads within corresponding threads of said aperture. It is preferred that the length of the bridge 541 when fully compressed is such that the bridge 541 is formed into a substantially straight line when both shank halves 529 reach the position at which they are parallel to the inner surface of said aperture, the screw 511 thus being in said second position. However, those skilled in the art will recognize that other lengths of the bridge 541 may be sufficient for moving the shank 515 into a secure position within said aperture.

As with the machine screw 11, it will be apparent to those skilled in the art that the screw 511 of the present invention may be made of a variety of materials, including those which are common with machine screws and fasteners. For example, it may be desirable that the screw 511 be made of a resilient material such as nylon, for allowing the screw 511 to reform naturally into its original shape when the screw 511 is rotated in a direction suitable for extraction and the screw 511 is thereby moved a distance from said aperture closed end, for allowing relatively easy removal of the screw 511 from said aperture. Similarly, it may be desirous to have the screw 511 formed of a semi-flexible metal, for an application needing a durable fastener with greater rigidity. Also, one embodiment similar to that illustrated in FIGS. 2B and 2C, may include a distal section 519 made of a flexible material (such as nylon) affixed along line Z—Z to a proximal section 517 formed of a metal, for combining the durable rigidity of metal with the flexibility of a plastic type material. Additionally, the slot 523 and head 513 of the screw 511 may be formed in various other fashions in accordance with the instant invention, including fashions similar to those of the screw 11 illustrated in FIGS. 2A, 2B, 2C, 2D, 2E, 2F, 2G, 2H, 2J, and 2K and described above.

In FIGS. 8A through 13C are illustrated additional embodiments of the machine screw according to the present invention having a first position substantially similar to the second position of the earlier described embodiments of the invention, wherein opposite sides of the screw shank and confronting faces or sides of an elongate slot extending axially through the shank are substantially parallel, and the outside diameter of the threads of the shank distal portion is larger than the inner diameter of a cylindrical correspondingly threaded aperture into which the screws may be inserted. These additional embodiments are further deformable from said first position to a second position which is substantially similar to the first position of the earlier described screws of the invention, wherein the least outside diameter of the threads of the shank distal portion is smaller than the corresponding inner diameter of said threaded aperture, and wherein the outside diameter of the shank proximal portion is larger than the inner diameter of said threaded aperture. Such deformation of each of these additional embodiments is designed to occur during an initial stage of its insertion into said threaded aperture via applying a distally oriented, non-rotating axial force against the head of the screw after the shank distal end has been placed into an open end of said aperture, for minimizing contacting surface area between threads of the screw and said aperture during said insertion. Furthermore, these additional embodiments are reformable from said second position back to said first position during a final stage of said insertion, for maximizing the contacting surface area between threads of the screw and said aperture after the shank has been fully inserted into said aperture.

FIGS. 8A, 8B and 8C illustrate another embodiment of a machine screw 611 according to the present invention, for use in engaging a correspondingly threaded aperture, which aperture is substantially cylindrical. The machine screw 611 is very similar to the screw 11 and includes a head 613 adapted to be rotated, and a substantially cylindrical shank 615 connected to the head 613 and extending axially therefrom. The shank 615 has a proximal portion 617 adjacent to the head 613, and a distal portion 619 with a distal end 621 opposite the head 613, each of which portions may be of various lengths relative to the other. At least a portion of the shank 615 includes threads on the surface thereof formed in a fashion such as that which is known, for engaging said correspondingly threaded aperture. The shank 615 further includes an elongate, open-sided slot 623 extending axially from a slot open end 625 at the shank distal end 621 and through at least the shank distal portion 619 to a slot closed end 627, dividing at least the shank distal portion 619 into two semi-cylindrical shank legs or halves 629. Two substantially planar confronting shank-half faces 629F, one on either side of the axis of the shank 615, further define the slot 623.

The shank 615 is formed initially in a first position (illustrated in FIG. 8A) wherein opposite sides 629S on the exterior surface of the shank halves 629 and confronting faces 629F are substantially parallel, and the outside diameter D61 of the threads of the shank distal portion 619 is larger than the inner diameter of said threaded aperture. The shank 615 is deformable into a second position (illustrated in FIG. 8B), wherein the least outside diameter D62 of the threads of the shank distal portion 619 is smaller than the corresponding inner diameter of said threaded aperture, and wherein the outside diameter P61 of the shank proximal portion 617 is larger than the inner diameter of said threaded aperture. For purposes of clarifying the illustration, the outside diameter of the threads of the shank 615 is defined as the distance from the outside edge of a thread segment on one shank half 629, to the outside edge of a thread segment on the other shank half 629 directly opposite the shank 615 axis; and, the inner diameter of the threaded aperture is defined as the minimum distance between the inside edge of aperture threads on opposite sides of the aperture axis. In this second position, the distance between the confronting faces 629F of the slot 623 is smaller at the slot open end 625 than at the slot closed end 627.

In operation, said deformation of the screw 611 from the first to the second position occurs via applying a distally oriented, non-rotating axial force against the head 613 after the shank distal end 621 has been placed into an open end of said aperture. Because the outside diameter D61 of the threads of the shank distal portion 619 is larger than the inner diameter of said threaded aperture, a portion of said distally oriented insertion force is translated into a radially oriented force relative to the shank 615 axis between threaded inner walls of said aperture and the corresponding threaded outer surface of the shank halves 629, causing the screw 611 to move from its first position into its second position as the screw 611 is initially inserted into said aperture. Thus causing the diameter D62 of the shank distal end 621 to be smaller than the inner diameter of said aperture minimizes the contacting surface area between threads of the screw and said aperture.

Once the screw 611 has been fully inserted into said aperture, it may be reformed back into the first position for allowing full engagement between the corresponding threads of the shank 615 and said aperture. In the screw 611, means for such reforming comprises a thin rod 633 having a diameter substantially equivalent to the distance between confronting faces 629F when the shank 615 is in said first position. The rod 633 is preferably cylindrical; however, it may be fashioned into various shapes for more fully corresponding to the shape of the slot 623 when said slot 623 is in the first position. An axial bore 635 is further provided, extending along the axis of the screw 611 between the slot 623 closed end 627 and the proximal end of the head 613, for allowing the insertion of said rod 633 therethrough and into the slot 623. As the rod 633 is inserted distally through the bore 635 and the slot 623, each of the shank halves 629 is thereby forced apart and away from the axis of the shank 615 in a radially oriented direction relative to the shank 615 axis, thus reforming the shank 615 into said first position. It has been found, that movement of the shank 615 back into said first position after the screw 611 has been inserted into said aperture causes a proper seating of the threads of the screw 611 within corresponding threads of said aperture.

It is preferred that the rod 633 is substantially equivalent in length to the shank 615, for allowing said rod 633 to be inserted entirely into the shank 615, and thereby eliminating the ability to remove the rod 633 apart from the removal of the screw 611. In this fashion, the rod 633 must be extracted from said aperture simultaneously with the screw 611 by rotating the screw 611 in the extractable direction. It is also preferred that the rod 633 include a pointed distal end 637 for initial insertion into the bore 635, and for use as a wedge in moving the shank halves 629 apart from each other, from the second position back into the first position. It is further preferred that the rod 633 include a substantially flat proximal end 639, to which a hammer may be applied for supplying the required insertion force. It is anticipated that headless nails of a size which is common will be used as appropriate rods 633.

As with the machine screw 11, it will be apparent to those skilled in the art that the screw 611 of the present invention may be made of a variety of materials, including those which are common with machine screws and fasteners. However, it is preferred that the screw 611 is made of a resilient material such as nylon, for allowing the screw 611 to deform readily from the first position into the second position during its initial insertion into said aperture, and similarly to reform to its original shape after it has been fully inserted into said aperture, eliminating need for the rod 633. On the other hand, it may be desirous to have the screw 611 formed of a semi-flexible metal, for an application needing a durable fastener with greater rigidity. Also, one embodiment similar to that illustrated in FIGS. 2B and 2C, may include a distal section 619 made of a flexible material (such as nylon) affixed along line Z—Z to a proximal section 617 formed of a metal, for combining the durable rigidity of metal with the flexibility of a plastic type material. Additionally, the slot 623 and head 613 of the screw 611 may be formed in various other fashions in accordance with the instant invention, including fashions similar to those of the screw 11 illustrated in FIGS. 2A, 2B, 2C, 2D, 2E, 2F, 2G, 2H, 2J, and 2K and described above.

Illustrated in FIGS. 9A, 9B and 9C is another embodiment of a machine screw 711 according to the instant invention, for use in engaging a correspondingly threaded aperture, which aperture is substantially cylindrical. The screw 711 is similar to the screws 11, 111 and 611, in that it includes a head 713 adapted to be rotated, and a substantially cylindrical shank 715 connected to the head 713 and extending axially therefrom. The shank 715 has a proximal portion 717 adjacent to the head 713, and a distal portion 719 with a distal end 721 opposite the head 713, each of which portions may be of various lengths relative to the other. At least a portion of the shank 715 includes threads on the surface thereof formed in a fashion such as that which is known, for engaging said aperture. The shank 715 further includes an elongate, open-sided slot 723 extending axially from a slot open end 725 at the shank distal end 721 and through at least the shank distal portion 719 to a slot closed end 727, dividing at least the shank distal portion 719 into two semi-cylindrical shank legs or halves 729. Two substantially planar confronting shank-half faces 729F, one on either side of the axis of the shank 715, further define the slot 723.

The shank 715 is formed initially in a first position (illustrated in FIG. 9A) wherein opposite sides 729S on the exterior surface of the shank halves 729 and confronting faces 729F are substantially parallel, and the outside diameter D71 of the threads of the shank distal portion 719 is larger than the inner diameter of said threaded aperture, the outside diameter of the shank 715 and the inner diameter of said aperture being defined as substantially similar to the corresponding outside diameter of the shank 615 and the inner diameter of the correspondingly threaded aperture associated with the screw 611. The shank 715 is deformable into a second position (illustrated in FIG. 9B), wherein the least outside diameter D72 of the threads of the shank distal portion 719 is smaller than the corresponding inner diameter of said threaded aperture, and wherein the outside diameter P71 of the shank proximal portion 717 is larger than the inner diameter of said threaded aperture. In this second position, the distance between the confronting faces 729F of the slot 723 is smaller at the slot open end 725 than at the slot closed end 727.

In operation, said deformation of the screw 711 from the first to the second position occurs via applying a distally oriented, non-rotating axial force against the head 713 after the shank distal end 721 has been placed into an open end of said aperture. Because the outside diameter D71 of the threads of the shank distal portion 719 is larger than the inner diameter of said threaded aperture, a portion of said distally oriented insertion force is translated into a radially oriented force relative to the shank 715 axis between threaded inner walls of said aperture and the corresponding threaded outer surface of the shank halves 729, causing the screw 711 to move from its first position into its second position as the screw 711 is initially inserted into said aperture. Thus causing the diameter D72 of the shank distal end 721 to be smaller than the inner diameter of said aperture minimizes the contacting surface area between threads of the screw 711 and said aperture. Once the screw 711 has been fully inserted into said aperture, it may be reformed back into the first position for allowing full engagement between the corresponding threads of the shank 715 and said aperture.

Like the shank 615 of screw 611, in order that the contacting surface area between the corresponding threads of the shank 715 and the associated aperture may be increased after the shank 715 is inserted into said aperture, the shank 715 may be reformed into its first position (illustrated in FIG. 9B), for allowing full engagement between the threads of the shank 715 and said aperture. In the machine screw 711, such deformation occurs through the use of a thin rod 733 substantially similar to the rod 633 associated with the screw 611, having a diameter substantially equivalent to the distance between confronting faces 729F when the shank 715 is in said first position. An axial bore 735 is further provided in the screw 711, extending axially between the slot closed end 727 and the proximal end of the head 713, for allowing the insertion of said rod 733 therethrough and into the slot 723. As the rod 733 is inserted distally through the bore 735 and the slot 723, each of the shank halves 729 is forced apart from the axis of the shank 715 in a radially oriented direction relative to the shank 715 axis, placing the shank 715 back into said first position. It has been found, that moving the shank 715 back into said first position causes a proper seating of the threads of the screw 711 within corresponding threads of said aperture.

Additionally, as with the screw 111, the shank 715 includes a bridge 741 connected via a living hinge to the distal end 721 of one of the shank halves 729. The bridge 741 extends proximally into the slot 723 from the distal end 721 of the shank half 729 to which it is connected, and is movable in a rotating fashion about the point at which it is connected to the shank half 729 and toward the shank distal end 721, by pressure applied thereto through insertion of the rod 733 distally into the slot 723. It is preferred that the length of the bridge 741 is sufficient for engaging either the face 729F of the opposite shank half 729, or the opposite interior surface of said aperture, when the shank 715 is moved into the second position. This allows for locking the shank 715 into the second position, such as may be desirable when using a rod 733 that is made substantially longer than the screw 711 for removal from said screw after insertion of the screw 711. It is preferred that the bridge 741 is similarly movable in a proximal direction toward the head 713 after the screw 711 is extracted from said aperture, so that the screw 711 may be fully reusable.

As with the machine screw 11, it will be apparent to those skilled in the art that the screw 711 of the present invention may be made of a variety of materials, including those which are common with machine screws and fasteners. However, it is preferred that the screw 711 is made of a resilient material such as nylon, for allowing the screw 711 to deform readily from the first position into the second position during its initial insertion into said aperture, and similarly to reform to its original shape after it has been fully inserted into said aperture, eliminating need for the rod 733. On the other hand, it may be desirous to have the screw 711 formed of a semi-flexible metal, for an application needing a durable fastener with greater rigidity. Also, one embodiment similar to that illustrated in FIGS. 2B and 2C, may include a distal section 719 made of a flexible material (such as nylon) affixed along line Z—Z to a proximal section 717 formed of a metal, for combining the durable rigidity of metal with the flexibility of a plastic type material. Additionally, the slot 723 and head 713 of the screw 711 may be formed in various other fashions in accordance with the instant invention, including fashions similar to those of the screw 11 illustrated in FIGS. 2A, 2B, 2C, 2D, 2E, 2F, 2G, 2H, 2J, and 2K and described above.

Figure 10A:
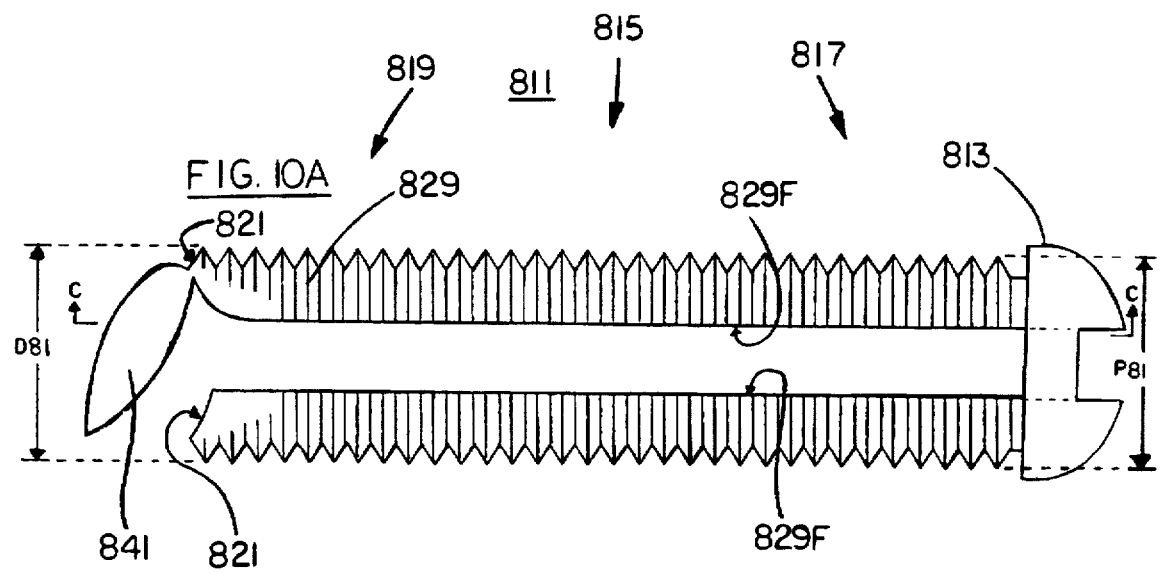
FIG. 10A is a side elevational view of another embodiment of a machine screw according to the present invention, wherein the machine screw is in a first position prior to insertion into a correspondingly threaded aperture (not shown)
Figure 10B:
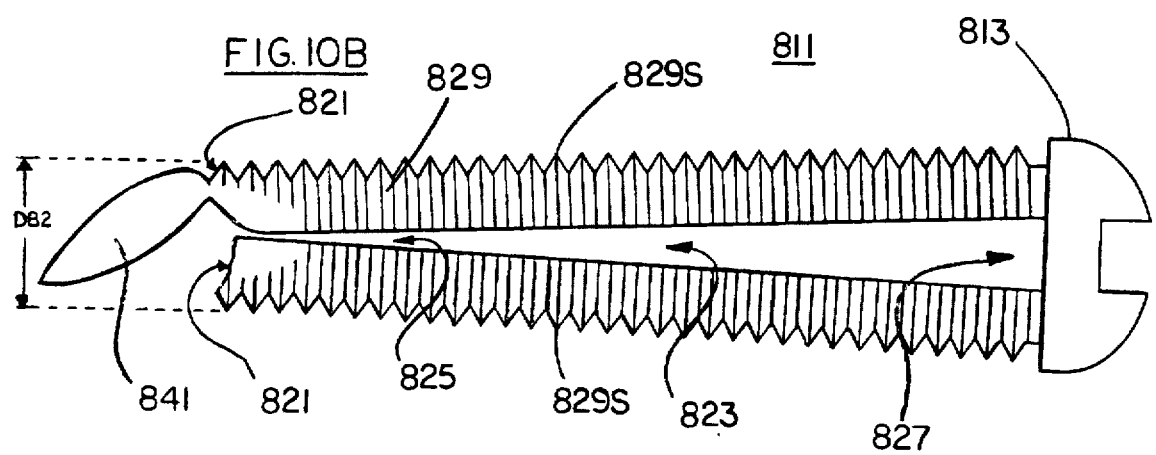
FIG. 10B is a side elevational view of the embodiment of FIG. 10A, wherein the machine screw is in a second position, during insertion into said aperture.
Figure 10C:
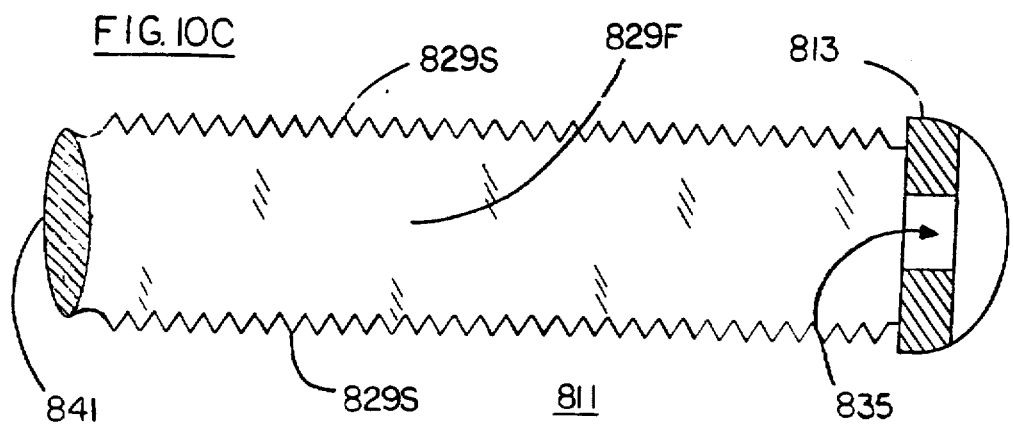
FIG. 10C is a side elevational view of the embodiment of FIG. 10A along line C—C.

Illustrated in FIGS. 10A, 10B and 10C is another embodiment of a machine screw 811 according to the instant invention, for use in engaging a correspondingly threaded aperture, which aperture is substantially cylindrical. While screws 11, 111, 611 and 711 are designed for use with correspondingly threaded apertures having either two open ends or a singular open end in combination with an aperture longer than the screw shank, the screw 811 is designed for use only with correspondingly threaded apertures having substantially the same length as the shank of the screw 811, with one closed end and one open end. The screw 811 is similar to the screw 11, 111, 611 and 711 in that it includes a head 813 adapted to be rotated, and a substantially cylindrical shank 815 connected to the head 813 and extending axially therefrom. The shank 815 has a proximal portion 817 adjacent to the head 813, and a distal portion 819 with a distal end 821 opposite the head 813, each of which portions may be of various lengths relative to the other. At least a portion of the shank 815 includes threads on the surface thereof formed in a fashion such as that which is known, for engaging said aperture. The shank 815 further includes an elongate, open-sided slot 823 extending axially from a slot open end 825 at the shank distal end 821 and through at least the shank distal portion 819 to a slot closed end 827, dividing at least the shank distal portion 819 into two semi-cylindrical shank legs or halves 829. Two substantially planar confronting shank-half faces 829F, one on either side of the axis of the shank 815, further define the slot 823.

The shank 815 is formed initially in a first position (illustrated in FIG. 10A) wherein opposite sides 829S on the exterior surface of the shank halves 829 and confronting faces 829F are substantially parallel, and the outside diameter D81 of the threads of the shank distal portion 819 is larger than the inner diameter of said threaded aperture, the outside diameter of the shank 815 and the inner diameter of said aperture being defined as substantially similar to the corresponding outside diameter of the shank 615 and the inner diameter of the correspondingly threaded aperture associated with the screw 611. The shank 815 is deformable into a second position (illustrated in FIG. 10B), wherein the least outside diameter D82 of the threads of the shank distal portion 819 is smaller than the corresponding inner diameter of said threaded aperture, and wherein the outside diameter P81 of the shank proximal portion 817 is larger than the inner diameter of said threaded aperture. In this second position, the distance between the confronting faces 829F of the slot 823 is smaller at the slot open end 825 than at the slot closed end 827.

In operation, said deformation of the screw 811 from the first to the second position occurs as in the screws 611 and 711, via applying a distally oriented, non-rotating axial force against the head 813 after the shank distal end 821 has been placed into an open end of said aperture. Because the outside diameter D81 of the threads of the shank distal portion 819 is larger than the inner diameter of said threaded aperture, a portion of said distally oriented insertion force is translated into a radially oriented force relative to the shank 815 axis between threaded inner walls 846 of said aperture and the corresponding threaded outer surface of the shank halves 829, causing the screw 811 to move from its first position into its second position as the screw 811 is initially inserted into the aperture 840. Thus causing the diameter D82 of the shank distal end 821 to be smaller than the inner diameter of said aperture minimizes the contacting surface area between threads of the screw 811 and said aperture.

Once the screw 811 has been fully inserted into said aperture, it may be reformed back into the first position for allowing full engagement between the corresponding threads of the shank 815 and said aperture. Unlike the screws 611 and 711, such reformation of the machine screw 811 does not occur through the use of a rod inserted into the slot 823 through a head axial bore, but rather occurs through cooperation with the closed end of said aperture.

Like the screw 711, the shank 815 includes a bridge 841 connected via a living hinge to the distal end 821 of one of the shank halves 829. Instead of extending into the slot 823 in similar fashion to the bridge 741 of the screw 711, however, the bridge 841 extends distally from the distal end 821 of the shank half 829 to which it is connected, for engaging the closed end of said aperture. The bridge 841 is movable in a rotating fashion about the point at which it is connected to the shank half 829 and toward the shank proximal portion 817, by a proximally oriented pressure applied thereto. Such pressure against the bridge 841 is provided by said aperture closed end in reaction to a distally oriented insertion force applied against the head 813 and translated through the shank 815 as the screw 811 is inserted into said aperture and the shank distal end 821 contacts said closed end. Such insertion force may be applied during the non-rotating or sliding portion of the insertion, during the rotating portion of said insertion, or both. When the screw 811 is thus inserted, the bridge 841 comes into contact with the aperture closed end, at which time the distally oriented insertion force against the head 813 is translated through said aperture closed end into said proximally oriented force applied against the bridge 841 in a direction opposite the insertion force. The proximally oriented force moves the bridge 841 about the point at which it is connected to the shank half 829 in a proximal direction toward the head 813 until such time as the insertion force stops, or the bridge 841 abuts the distal end 821 of the opposite shank half 829, or the shank distal ends 821 abut the inner surface of said aperture.

During such rotational movement of the bridge 841, a portion of said proximal force is further translated through the bridge 841 into a radially oriented force relative to the shank 815 axis and against the distal end 821 of the shank half 829 to which the bridge 841 is connected, for moving said shank half 829 away from the axis of the shank 815 and toward the inner surface of the aperture, for allowing the threads of said shank half 829 to fully engage the corresponding threads of the aperture inner surface. It has been found, that movement of the shank half 829 into said second position causes a proper seating of the threads of the screw 811 within corresponding threads of said aperture. Also like the screw 711, it is preferred that the length of the bridge 841 is sufficient for allowing the distal end 821 of the bridge 841 to engage either the distal end of the opposite shank half 829 or the opposite inner surface of said aperture when the screw 811 is moved into the second position, whereby the shank 815 may be locked into said second position.

It is preferred that the screw 811 be made of a resilient material such as nylon, for allowing the screw 811 to re-deform from the first position into the second position during extraction, and to reform from said second position to the first position after the screw 811 has been extracted from the aperture 840. Rotation of the screw 811 in a direction suitable for extraction moves the screw 811 away from the aperture closed end 842, thereby allowing the bridge 841 to move distally toward its place in said first position, away from the shank 815 axis and opposite shank half 829. When the bridge 841 has thus moved, unlocking the shank 815, a proximally oriented, non-rotating axial extraction force may then be applied to the distal portion of the head 813 (such as in pulling or with the claw of a hammer). As during the insertion of the screw 811 into said aperture, a portion of said proximally oriented extraction force is translated into a radially oriented force relative to the shank 815 axis between the threaded outer surface of the shank halves 829 and the corresponding threaded inner walls of said aperture, causing the shank 815 to move from its first position into its second position as the screw 811 is thus extracted. After extraction of the resilient screw 811 from said aperture, it may then reform naturally into its first position.

As with the machine screw 11, it will be apparent to those skilled in the art that the screw 811 of the present invention may be made of a variety of other materials, including those which are common with machine screws and fasteners. For example, it may be desirous to have the screw 811 formed of a semi-flexible metal, for an application needing a durable fastener with greater rigidity. Also, one embodiment similar to that illustrated in FIGS. 2B and 2C, may include a distal section 819 made of a flexible material (such as nylon) affixed along line Z—Z to a proximal section 817 formed of a metal, for combining the durable rigidity of metal with the flexibility of a plastic type material. Additionally, the slot 823 and head 813 of the screw 811 may be formed in various other fashions according to the instant invention, such as fashions substantially similar to those of the screw 11 illustrated in FIGS. 2A, 2B, 2C, 2D, 2E, 2F, 2G, 2H, 2J, and 2K and described above.

Figure 11A:
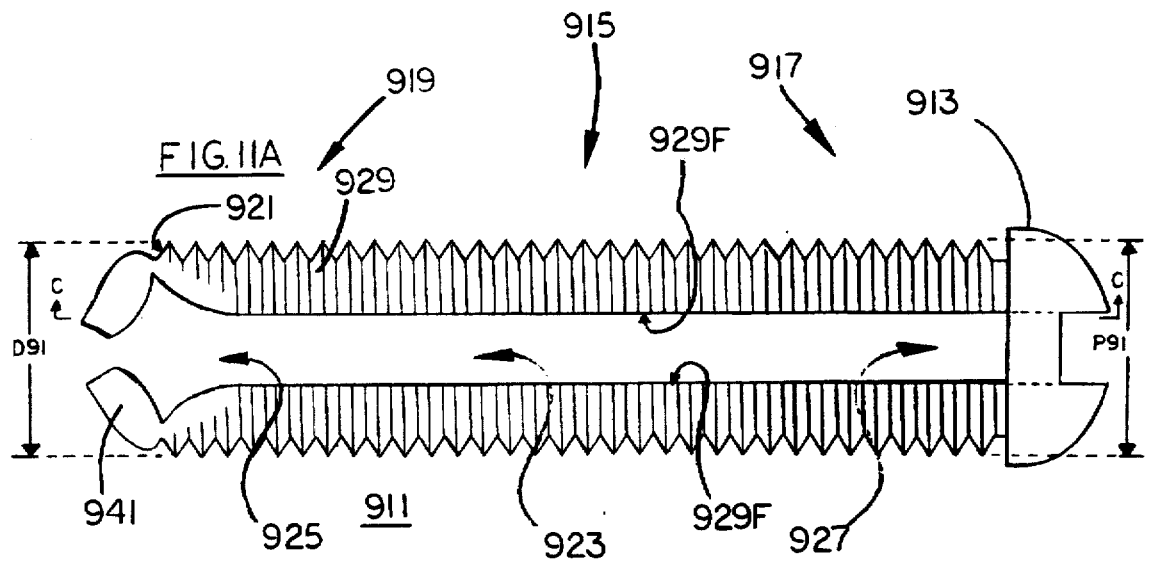
FIG. 11A is a side elevational view of another embodiment of a machine screw according to the present invention, wherein the machine screw is in a first position prior to insertion into a correspondingly threaded aperture (not shown)
Figure 11B:
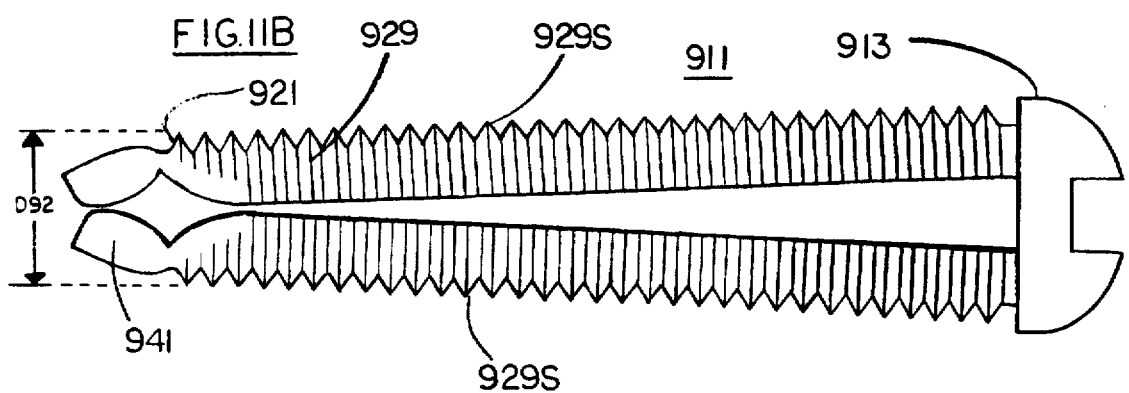
FIG. 11B is a side elevational view of the embodiment of FIG. 11A, wherein the machine screw is in a second position, during insertion into said aperture.
Figure 11C:
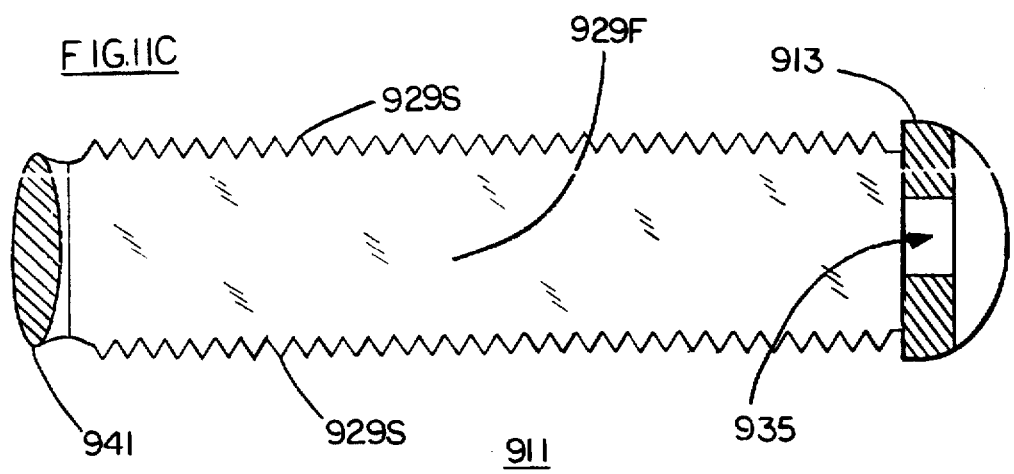
FIG. 11C is a side elevational view of the embodiment of FIG. 11A along line C—C.

Illustrated in FIGS. 11A, 11B and 11C is another embodiment of a machine screw 911 according to the instant invention, for use in engaging a correspondingly threaded aperture, which aperture is substantially cylindrical. The screw 911 is similar to the screw 811, in that it is designed for use only with correspondingly threaded apertures having substantially the same length as the shank of the screw 911, with one closed end and one open end. The screw 911 includes a head 913 adapted to be rotated, and a substantially cylindrical shank 915 connected to the head 913 and extending axially therefrom. The shank 915 has a proximal portion 917 adjacent to the head 913, and a distal portion 919 with a distal end 921 opposite the head 913, each of which portions may be of various lengths relative to the other. At least a portion of the shank 915 includes threads on the surface thereof formed in a fashion such as that which is known, for engaging said aperture. The shank 915 further includes an elongate, open-sided slot 923 extending axially from a slot open end 925 at the shank distal end 921 and through at least the shank distal portion 919 to a slot closed end 927, dividing at least the shank distal portion 919 into two semi-cylindrical shank legs or halves 929. Two substantially planar confronting shank-half faces 929F, one on either side of the axis of the shank 915, further define the slot 923.

The shank 915 is formed initially in a first position (illustrated in FIG. 11A) wherein opposite sides 929S on the exterior surface of the shank halves 929 and confronting faces 929F are substantially parallel, and the outside diameter D91 of the threads of the shank distal portion 919 is larger than the inner diameter of said threaded aperture, the outside diameter of the shank 915 and the inner diameter of said aperture being defined as substantially similar to the corresponding outside diameter of the shank 615 and the inner diameter of the correspondingly threaded aperture associated with the screw 611. The shank 915 is deformable into a second position (illustrated in FIG. 11B), wherein the least outside diameter D92 of the threads of the shank distal portion 919 is smaller than the corresponding inner diameter of said threaded aperture, and wherein the outside diameter P91 of the shank proximal portion 917 is larger than the inner diameter of said threaded aperture. In this second position, the distance between the confronting faces 929F of the slot 923 is smaller at the slot open end 925 than at the slot closed end 927.

In operation, said deformation of the screw 911 from the first to the second position occurs as in the screws 611, 711 and 811, via applying a distally oriented, non-rotating axial force against the head 913 after the shank distal end 921 has been placed into an open end of said aperture. Because the outside diameter D91 of the threads of the shank distal portion 919 is larger than the inner diameter of said threaded aperture, a portion of said distally oriented insertion force is translated into a radially oriented force relative to the shank 915 axis between threaded inner walls of said aperture and the corresponding threaded outer surface of the shank halves 929, causing the screw 911 to move from its first position into its second position as the screw 911 is initially inserted into said aperture. Thus causing the diameter D92 of the shank distal end 921 to be smaller than the inner diameter of said aperture minimizes the contacting surface area between threads of the screw 911 and the aperture.

Once the screw 911 has been fully inserted into said aperture, it may be reformed back into the first position for allowing full engagement between the corresponding threads of the shank 915 and said aperture. Like the screw 811 and unlike the screws 611 and 711, such deformation of the machine screw 911 occurs through cooperation with the closed end of said aperture.

Similar to the screws 711 and 811, the shank 915 of the screw 911 includes a bridge 941 connected via a living hinge to the distal end 921 of each of the shank halves 929, such that each shank half 929 is connected at its distal end 921 to the proximal end of a corresponding bridge 941. Each bridge 941 extends distally from the distal end 921 of the shank half 929 to which it is connected, for engaging the closed end 942 of the correspondingly threaded aperture. Like the bridge 841 of the screw 811, each bridge 941 is movable in a rotating fashion about the point at which it is connected to the associated shank half 929 and toward the shank proximal portion 917, by a proximally oriented pressure applied thereto. Such pressure against the bridge 941 is provided by said aperture closed end 942 in reaction to a distally oriented insertion force applied against the head 913 and translated through the shank 915 as the screw 911 is inserted into said aperture and the shank distal end 921 contacts said closed end. Such insertion force may be applied during the non-rotating or sliding portion of the insertion, during the rotating portion of said insertion, or both. When the screw 911 is thus inserted, each bridge 941 comes into contact with the aperture closed end 942, at which time the distally oriented insertion force against the head 913 is translated through said aperture closed end 942 into said proximally oriented force applied against each bridge 941 in a direction opposite the insertion force. The proximally oriented force moves each bridge 941 about the point at which it is connected to the associated shank half 929 in a proximal direction toward the head 913 until such time as the insertion force stops, or each bridge 941 abuts the distal end of the opposite bridge 941, or the distal end 921 of each shank half 929 abuts the inner surface of said aperture.

During such rotational movement of each bridge 941, a portion of said proximal force is further translated through each bridge 941 into a radially oriented force relative to the shank 915 axis and against the distal end 921 of the shank half 929 to which each bridge 941 is connected, for moving said shank half 929 away from the axis of the shank 915 and toward the inner surface of said aperture, for allowing the threads of said shank half 929 to fully engage the corresponding threads of the aperture inner surface. It has been found, that movement of the shank halves 929 into said second position causes a proper seating of the threads of the screw 911 within corresponding threads of the aperture. It is preferred that the length of each bridge 941 is sufficient for allowing the distal end of each bridge 941 to engage either the distal end of the opposite bridge 941 or the opposite interior surface of said aperture, whereby the shank 915 may be locked into the second position.

It is preferred that the screw 911 be made of a resilient material such as nylon, for allowing the screw 911 to re-deform from the first position into the second position during extraction, and to reform from said second position to the first position after the screw 911 has been extracted from said aperture. Rotation of the screw 911 in a direction suitable for extraction moves the screw 911 away from the aperture closed end, thereby allowing the bridge 941 to move distally toward its place in said first position, away from the shank 915 axis and opposite shank half 929. When the bridge 941 has thus moved, unlocking the shank 915, a proximally oriented, non-rotating axial extraction force may then be applied to the distal portion of the head 913 (such as in pulling or with the claw of a hammer). As during the insertion of the screw 911 into said aperture, a portion of said proximally oriented extraction force is translated into a radially oriented force relative to the shank 915 axis between the threaded outer surface of the shank halves 929 and the corresponding threaded inner walls of said aperture, causing the shank 915 to move from its first position into its second position as the screw 911 is thus extracted. After extraction of the resilient screw 911 from said aperture, it may then reform naturally into its first position.

As with the machine screw 11, it will be apparent to those skilled in the art that the screw 911 of the present invention may be made of a variety of other materials, including those which are common with machine screws and fasteners. For example, it may be desirous to have the screw 911 formed of a a semi-flexible metal, for an application needing a durable fastener with greater rigidity. Also, one embodiment similar to that illustrated in FIGS. 2B and 2C, may include a distal section 919 made of a flexible material (such as nylon) affixed along line Z—Z to a proximal section 917 formed of a metal, for combining the durable rigidity of metal with the flexibility of a plastic type material. Additionally, the slot 923 and head 913 of the screw 911 may be formed in various other fashions according to the instant invention, such as fashions substantially similar to those of the screw 11 illustrated in FIGS. 2A, 2B, 2C, 2D, 2E, 2F, 2G, 2H, 2J, and 2K and described above.

Illustrated in FIGS. 12A, 12B and 12C is another embodiment of a machine screw 1011 according to the instant invention, for use in engaging a correspondingly threaded aperture, which aperture is substantially cylindrical. The screw 1011 is similar to the screws 811 and 911, in that it is designed for use only with correspondingly threaded apertures having substantially the same length as the shank of the screw 1011, with one closed end and one open end. The screw 1011 includes a head 1013 adapted to be rotated, and a substantially cylindrical shank 1015 connected to the head 1013 and extending axially therefrom. The shank 1015 has a proximal portion 1017 adjacent to the head 1013, and a distal portion 1019 with a distal end 1021 opposite the head 1013, each of which portions may be of various lengths relative to the other. At least a portion of the shank 1015 includes threads on the surface thereof formed in a fashion such as that which is known, for engaging said aperture. The shank 1015 further includes an elongate, open-sided slot 1023 extending axially from a slot open end 1025 at the shank distal end 1021 and through at least the shank distal portion 1019 to a slot closed end 1027, dividing at least the shank distal portion 1019 into two semi-cylindrical shank legs or halves 1029. Two substantially planar confronting shank-half faces 1029F, one on either side of the axis of the shank 1015, further define the slot 1023.

The shank 1015 is formed initially in a first position (illustrated in FIG. 12A) wherein opposite sides 1029S on the exterior surface of the shank halves 1029 and confronting faces 1029F are substantially parallel, and the outside diameter D101 of the threads of the shank distal portion 1019 is larger than the inner diameter of said threaded aperture, the outside diameter of the shank 1015 and the inner diameter of said aperture being defined as substantially similar to the corresponding outside diameter of the shank 615 and the inner diameter of the correspondingly threaded aperture associated with the screw 611. The shank 1015 is deformable into a second position (illustrated in FIG. 12B), wherein the least outside diameter D102 of the threads of the shank distal portion 1019 is smaller than the corresponding inner diameter of said threaded aperture, and wherein the outside diameter P101 of the shank proximal portion 1017 is larger than the inner diameter of said threaded aperture. In this second position, the distance between the confronting faces 1029F of the slot 1023 is smaller at the slot open end 1025 than at the slot closed end 1027.

In operation, said deformation of the screw 1011 from the first to the second position occurs as in the screws 611, 711, 811 and 911, via applying a distally oriented, non-rotating axial force against the head 1013 after the shank distal end 1021 has been placed into an open end of said aperture. Because the outside diameter D101 of the threads of the shank distal portion 1019 is larger than the inner diameter of said threaded aperture, a portion of said distally oriented insertion force is translated into a radially oriented force relative to the shank 1015 axis between threaded inner walls of the aperture 1040 and the corresponding threaded outer surface of the shank halves 1029, causing the screw 1011 to move from its first position into its second position as the screw 1011 is initially inserted into said aperture. Thus causing the diameter D102 of the shank distal end 1021 to be smaller than the inner diameter of said aperture minimizes the contacting surface area between threads of the screw 1011 and said aperture.

Once the screw 1011 has been fully inserted into said aperture, it may be reformed back into the first position for allowing full engagement between the corresponding threads of the shank 1015 and said aperture. Like the screws 811 and 911, such deformation of the machine screw 1011 occurs through cooperation with the closed end of said aperture.

Similar to the screws 711, 811 and 911, the shank 1015 of the screw 1011 is designed for use only with correspondingly threaded apertures (like said aperture illustrated in FIG. 12A) having one closed end and one open end. Accordingly, the shank 1015 includes a single bridge 1041 connected via a living hinge at each of two bridge ends 1041E to the distal end 1021 of each of the shank halves 1029. The bridge 1041 is divided substantially into two elongate bridge halves 1041H, each of which is connected at a distal end to a similar distal end of the other bridge half 1041H for forming a bridge center 1041C of the bridge 1041, and at a proximal end 1041E to the distal end 1021 of a shank half 1029. The bridge 1041 is bent in an angle at its center 1041C, forming substantially a V shape, such that said center 1041C extends distally from the distal end 1021 of both shank halves 1029, for engaging the closed end of the correspondingly threaded aperture. Like the bridge 941 of the screw 911, each bridge half 1041H is movable in a rotating fashion about the point at which it is connected to the associated shank half 1029, and is similarly movable in a rotating fashion about the bridge center 1041C. Each bridge half 1041H is further movable toward the shank proximal portion 1017 by a proximally oriented pressure applied thereto. Such pressure against the bridge 1041 is provided by said aperture closed end 1042 in reaction to a distally oriented insertion force applied against the head 1013 and translated through the shank 1015 as the screw 1011 is inserted into said aperture and the shank distal end 1021 contacts said closed end. Such insertion force may be applied during the non-rotating or sliding portion of the insertion, during the rotating portion of said insertion, or both. When the screw 1011 is thus inserted, the bridge center 1041C comes into contact with said aperture closed end, at which time the distally oriented insertion force against the head 1013 is translated through said aperture closed end 1042 into said proximally oriented force applied against the bridge center 1041C in an opposite direction to the insertion force. The proximally oriented force moves the bridge center 1041C in a proximal direction toward the head 1013 until such time as the insertion force stops, or the distal end 1021 of each shank half 1029 abuts the inner surface of said aperture, or the screw 1011 has reformed substantially into said first position. During such movement, a portion of the proximal force is further translated through each bridge half 1041H into a radially oriented force relative to the shank 1015 axis and against the distal end 1021 of the shank half 1029 to which the bridge half 1041H is connected, for moving said shank half 1029 away from the axis of the shank 1015 and toward the inner surface of said aperture, for allowing the threads of said shank half 1029 to fully engage the corresponding threads of the aperture inner surface. It has been found, that movement of the shank halves 1029 into this second position causes a proper seating of the screw 1011 threads within corresponding threads of said aperture. It is preferred that the length of each bridge half 1041H is such that the bridge 1041 is formed into a substantially straight line when both shank halves 1029 reach the position at which they are parallel to the inner surface of the aperture as described above, the screw 1011 thus being in said second position. However, those skilled in the art will recognize that other lengths of each bridge half 1041H may be sufficient for moving the shank 1015 into a secure position within said aperture.

It is preferred that the screw 1011 be made of a resilient material such as nylon, for allowing the screw 1011 to re-deform from the first position into the second position during extraction, and to reform from said second position to the first position after the screw 1011 has been extracted from said aperture. Rotation of the screw 1011 in a direction suitable for extraction moves the screw 1011 away from the aperture closed end, thereby allowing the bridge 1041 to move distally toward its place in said first position, away from the shank 1015 axis and opposite shank half 1029. When the bridge 1041 has thus moved, unlocking the shank 1015, a proximally oriented, non-rotating axial extraction force may then be applied to the distal portion of the head 1013 (such as in pulling or with the claw of a hammer). As during the insertion of the screw 1011 into said aperture, a portion of said proximally oriented extraction force is translated into a radially oriented force relative to the shank 1015 axis between the threaded outer surface of the shank halves 1029 and the corresponding threaded inner walls of the aperture, causing the shank 1015 to move from its first position into its second position as the screw 1011 is thus extracted. After extraction of the resilient screw 1011 from said aperture, it may then reform naturally into its first position.

As with the machine screw 11, it will be apparent to those skilled in the art that the screw 1011 of the present invention may be made of a variety of other materials, including those which are common with machine screws and fasteners. For example, it may be desirous to have the screw 1011 formed of a semi-flexible metal, for an application needing a durable fastener with greater rigidity. Also, one embodiment similar to that illustrated in FIGS. 2B and 2C, may include a distal section 1019 made of a flexible material (such as nylon) affixed along line Z—Z to a proximal section 1017 formed of a metal, for combining the durable rigidity of metal with the flexibility of a plastic type material. Additionally, the slot 1023 and head 1013 of the screw 1011 may be formed in various other fashions according to the instant invention, such as fashions substantially similar to those of the screw 11 illustrated in FIGS. 2A, 2B, 2C, 2D, 2E, 2F, 2G, 2H, 2J, and 2K and described above.

Illustrated in FIGS. 13A, 13B and 13C is another embodiment of a machine screw 1111 according to the instant invention, for use in engaging a correspondingly threaded aperture, which aperture is substantially cylindrical. The screw 1111 is similar to the screws 811, 911 and 1011, in that it is designed for use only with correspondingly threaded apertures having substantially the same length as the shank of the screw 1111, with one closed end and one open end. The screw 1111 includes a head 1113 adapted to be rotated, and a substantially cylindrical shank 1115 connected to the head 1113 and extending axially therefrom. The shank 1115 has a proximal portion 1117 adjacent to the head 1113, and a distal portion 1119 with a distal end 1121 opposite the head 1113, each of which portions may be of various lengths relative to the other. At least a portion of the shank 1115 includes threads on the surface thereof formed in a fashion such as that which is known, for engaging the aperture. The shank 1115 further includes an elongate, open-sided slot 1123 extending axially from a slot open end 1125 at the shank distal end 1121 and through at least the shank distal portion 1119 to a slot closed end 1127, dividing at least the shank distal portion 1119 into two semi-cylindrical shank legs or halves 1129. Two substantially planar confronting shank-half faces 1129F, one on either side of the axis of the shank 1115, further define the slot 1123.

The shank 1115 is formed initially in a first position (illustrated in FIG. 13A) wherein opposite sides 1129S on the exterior surface of the shank halves 1129 and confronting faces 1129F are substantially parallel, and the outside diameter D111 of the threads of the shank distal portion 1119 is larger than the inner diameter of said threaded aperture, the outside diameter of the shank 1115 and the inner diameter of said aperture being defined as substantially similar to the corresponding outside diameter of the shank 615 and the inner diameter of the correspondingly threaded aperture associated with the screw 611. The shank 1115 is deformable into a second position (illustrated in FIG. 13B), wherein the least outside diameter D112 of the threads of the shank distal portion 1119 is smaller than the corresponding inner diameter of said threaded aperture, and wherein the outside diameter P111 of the shank proximal portion 1117 is larger than the inner diameter of said threaded aperture. In this second position, the distance between the confronting faces 1129F of the slot 1123 is smaller at the slot open end 1125 than at the slot closed end 927.

In operation, said deformation of the screw 1111 from the first to the second position occurs as in the screws 611, 711, 811 and 911, via applying a distally oriented, non-rotating axial force against the head 1113 after the shank distal end 1121 has been placed into an open end of said aperture. Because the outside diameter D111 of the threads of the shank distal portion 1119 is larger than the inner diameter of said threaded aperture, a portion of said distally oriented insertion force is translated into a radially oriented force relative to the shank 1115 axis between threaded inner walls of the aperture and the corresponding threaded outer surface of the shank halves 1129, causing the screw 1111 to move from its first position into its second position as the screw 1111 is initially inserted into the aperture. Thus causing the diameter D112 of the shank distal end 1121 to be smaller than the inner diameter of said aperture minimizes the contacting surface area between threads of the screw 1111 and said aperture.

Once the screw 1111 has been fully inserted into said aperture, it may be reformed back into the first position for allowing full engagement between the corresponding threads of the shank 1115 and said aperture. Like the screws 811, 911 and 1011, such deformation of the machine screw 1111 occurs through cooperation with the closed end of said aperture.

Similar to the screws 711, 811, 911 and 1011, the shank 1115 of the screw 1111 is designed for use only with correspondingly threaded apertures (like said aperture illustrated in FIG. 13A) having one closed end 1142 and one open end 1144. Accordingly, the shank 1115 includes a compressible bridge 1141 connected integrally to the distal end 1121 of each of the shank halves 1129 and formed in substantially a V shape having an apex 1141C extending distally from the distal end 1121 of both shank halves 1129, for engaging the closed end of said correspondingly threaded aperture. The bridge 1141 is compressible toward the shank proximal portion 1117 by a proximally oriented pressure applied against the apex 1141C. Such pressure against the bridge 1141 is provided by said aperture closed end in reaction to a distally oriented insertion force applied against the head 1113 and translated through the shank 1115 as the screw 1111 is inserted into said aperture and the shank distal end 1121 contacts said closed end. Such insertion force may be applied during the non-rotating or sliding portion of the insertion, during the rotating portion of said insertion, or both. When the screw 1111 is thus inserted, the bridge apex 1141C comes into contact with the aperture closed end, at which time the distally oriented insertion force against the head 1113 is translated through said aperture closed end 1142 into said proximally oriented force applied against the bridge apex 1141C in an opposite direction to the insertion force. The proximally oriented force compresses the bridge apex 1141C in a proximal direction toward the head 1113 until such time as the insertion force stops, or the distal end 1121 of each shank half 1129 abuts the aperture inner surface 1146, or the bridge 1141 is fully compressed. During such movement, a portion of the proximal force is further translated through the bridge 1141 into a radially oriented force relative to the shank 1115 axis and against the distal end 1121 of each shank half 1129, for moving said shank half 1129 away from the axis of the shank 1115 and toward the inner surface of the aperture, for allowing the threads of said shank half 1129 to fully engage the corresponding threads of the aperture inner surface. It has been found, that such movement of the shank halves 1129 into said second position causes a proper seating of the screw 1111 threads within corresponding threads of said aperture. It is preferred that the length of the bridge 1141 when fully compressed is such that the bridge 1141 is formed into a substantially straight line when both shank halves 1129 reach the position at which they are parallel to the inner surface of said aperture, the screw 1111 thus being in said second position. However, those skilled in the art will recognize that other lengths of the bridge 1141 may be sufficient for moving the shank 1115 into a secure position within said aperture.

It is preferred that the screw 1111 be made of a resilient material such as nylon, for allowing the screw 1111 to re-deform from the first position into the second position during extraction, and to reform from said second position to the first position after the screw 1111 has been extracted from said aperture. Rotation of the screw 1111 in a direction suitable for extraction moves the screw 1111 away from the aperture closed end, thereby allowing the bridge 1141 to move distally toward its place in said first position, away from the shank 1115 axis and opposite shank half 1129. When the bridge 1141 has thus moved, unlocking the shank 1115, a proximally oriented, non-rotating axial extraction force may then be applied to the distal portion of the head 1113 (such as in pulling or with the claw of a hammer). As during the insertion of the screw 1111 into said aperture, a portion of said proximally oriented extraction force is translated into a radially oriented force relative to the shank 1115 axis between the threaded outer surface of the shank halves 1129 and the corresponding threaded inner walls of the aperture, causing the shank 1115 to move from its first position into its second position as the screw 1111 is thus extracted. After extraction of the resilient screw 1111 from the aperture, it may then reform naturally into its first position.

As with the machine screw 11, it will be apparent to those skilled in the art that the screw 1111 of the present invention may be made of a variety of other materials, including those which are common with machine screws and fasteners. For example, it may be desirous to have the screw 1111 formed of a semi-flexible metal, for an application needing a durable fastener with greater rigidity. Also, one embodiment similar to that illustrated in FIGS. 2B and 2C, may include a distal section 1119 made of a flexible material (such as nylon) affixed along line Z—Z to a proximal section 1117 formed of a metal, for combining the durable rigidity of metal with the flexibility of a plastic type material. Additionally, the slot 1123 and head 1113 of the screw 1111 may be formed in various other fashions according to the instant invention, such as fashions substantially similar to those of the screw 11 illustrated in FIGS. 2A, 2B, 2C, 2D, 2E, 2F, 2G, 2H, 2J, and 2K and described above.

The inventor has given a non-limiting description of several embodiments of the present invention, to which many changes may be made without deviating from the spirit of the inherent inventive concept. While this invention has been described with reference to such illustrative embodiments, this description is not intended to be construed in a limiting sense. Various modifications and combinations of the various embodiments as well as other embodiments of this invention will be apparent to a person skilled in the art upon reference to this description. It is therefore contemplated that the appended claims cover any such modifications or embodiments that fall within the true scope of the present invention.

What is claimed is:

1. A machine screw for engaging a correspondingly threaded aperture, said machine screw comprising:
    a shank having a proximal portion and a distal portion, said proximal portion having a proximal end opposite the distal portion, and said distal portion having a distal end opposite the proximal portion;
    at least a portion of the shank including threads on a surface thereof for engaging said threaded aperture;
    said shank further including an elongate, open-sided slot with two confronting faces; said slot extending axially from a slot distal end at the shank distal end and through at least the shank distal portion to a slot proximal end, dividing at least the shank distal portion into two shank halves, a bridge is formed at the slot distal extending between the distal end of each shank half;
    said shank further having a first position wherein an outside diameter of threads on the shank distal portion is adapted to be smaller than and inner diameter of the threaded aperture for non-rotating insertion therein, and wherein an outside diameter of the shank proximal portion is adapted to be substantially equivalent to the inner diameter of the threaded aperture; and further wherein the distance between the confronting faces of the slot is smaller at the slot distal end than at the slot proximal end; and
    said shank further being deformable into a shank second position, wherein opposite sides of the shank halves are substantially parallel such that the shank is substantially cylindrical and the outside diameter of the threads of the shank distal portion is substantially the same as the shank proximal portion and is adapted to be larger than the inner diameter of said threaded aperture, for fully engaging said threaded aperture.

2. A machine screw as recited in claim 1, further including a head formed at said proximal end such that the shank extends axially therefrom, which head is adapted to be rotated.

3. A machine screw as recited in claim 1, wherein the screw is fabricated from resilient material.

4. A machine screw as recited in claim 1, wherein said bridge extends distally from the distal end of the shank halves, which bridge is adapted to move toward the proximal end by longitudinal compression of the screw against a closed end of the aperture, said bridge thereby exerting a radially oriented force relative to the shank axis and against the distal end of each shank half to which it is connected, for deforming said shank from the first position into the second position.

5. A machine screw as recited in claim 1, wherein said bridge is adapted to compress by longitudinal compression of the screw against a closed end of the aperture, said compressible bridge exerting a radially oriented force relative to the shank axis and against the distal end of each shank half for deforming said shank from the first position into the second position.

* * * * *